US011057079B2

(12) United States Patent
Calzolari et al.

(10) Patent No.: US 11,057,079 B2
(45) Date of Patent: Jul. 6, 2021

(54) DYNAMIC THRESHOLDS FOR ANTENNA SWITCHING DIVERSITY

(71) Applicant: QUALCOMM Incorporated, San Diego, CA (US)

(72) Inventors: Diego Calzolari, San Diego, CA (US); Peyman Hesami, San Diego, CA (US); Tomas Galvez Santaella, San Diego, CA (US); Mustafa Saglam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 16/455,460

(22) Filed: Jun. 27, 2019

(65) Prior Publication Data
US 2020/0412417 A1 Dec. 31, 2020

(51) Int. Cl.
| | |
|---|---|
| *H04B 1/7097* | (2011.01) |
| *H04B 7/0404* | (2017.01) |
| *H04B 17/318* | (2015.01) |
| *G06N 3/08* | (2006.01) |
| *H04B 7/06* | (2006.01) |
| *H04W 52/24* | (2009.01) |

(52) U.S. Cl.
CPC .......... *H04B 7/0404* (2013.01); *G06N 3/084* (2013.01); *H04B 7/0608* (2013.01); *H04B 17/318* (2015.01); *H04W 52/245* (2013.01)

(58) Field of Classification Search
CPC ................................ G06N 20/00; G01S 7/417
See application file for complete search history.

(56) References Cited

U.S. PATENT DOCUMENTS

| | | | |
|---|---|---|---|
| 5,166,927 A | * | 11/1992 | Iida ........................ H04L 45/08 370/238 |
| 5,603,107 A | | 2/1997 | Gottfried et al. |
| 5,991,613 A | | 11/1999 | Euscher et al. |
| | | (Continued) | |

FOREIGN PATENT DOCUMENTS

WO    WO2019045606 A1    3/2019

OTHER PUBLICATIONS

International Search Report and Written Opinion—PCT/US2020/038942—ISA/EPO—dated Mar. 25, 2021.

*Primary Examiner* — Cindy Trandai
(74) *Attorney, Agent, or Firm* — Holland & Hart LLP

(57) ABSTRACT

Methods, systems, and devices for wireless communications are described. In some systems, a user equipment (UE) may implement a dynamic threshold for antenna switching. The dynamic threshold may improve the percentage of time that a UE operates using an "optimal" antenna (e.g., an antenna with the highest reference signal received power (RSRP)) as compared to a static threshold. For example, a UE may communicate with another device using a first antenna. The UE may track a current communication measurement for the first antenna (e.g., an RSRP value) and may perform an antenna switching test based on the measurement. For the test, the UE may update the dynamic threshold for antenna switching based on a machine learning agent, where the agent may include a neural network that determines the updated dynamic threshold value. The UE may perform a comparison with the dynamic threshold to determine whether to switch operating antennas.

38 Claims, 16 Drawing Sheets

(56) References Cited

U.S. PATENT DOCUMENTS

| | | | |
|---|---|---|---|
| 8,265,552 B2 | 9/2012 | Kamel et al. | |
| 8,907,847 B2* | 12/2014 | Tong | H01Q 21/28 |
| | | | 342/432 |
| 8,971,948 B1* | 3/2015 | Breslin | H04B 7/04 |
| | | | 455/522 |
| 10,039,016 B1 | 7/2018 | Larish et al. | |
| 10,355,344 B1* | 7/2019 | Ruaro | H04B 1/40 |
| 10,666,342 B1* | 5/2020 | Landis | G06N 3/088 |
| 2008/0014891 A1* | 1/2008 | Jin | H04B 7/0808 |
| | | | 455/277.1 |
| 2012/0101411 A1* | 4/2012 | Hausdorff | A61B 5/6831 |
| | | | 600/595 |
| 2012/0219040 A1 | 8/2012 | Valentine et al. | |
| 2013/0308608 A1* | 11/2013 | Hu | H01Q 3/24 |
| | | | 370/334 |
| 2015/0098387 A1 | 4/2015 | Garg et al. | |
| 2015/0349870 A1 | 12/2015 | Chen et al. | |
| 2016/0097853 A1* | 4/2016 | Kamo | G01S 13/584 |
| | | | 342/70 |
| 2016/0165462 A1* | 6/2016 | Tan | H04W 24/02 |
| | | | 370/254 |
| 2016/0198474 A1 | 7/2016 | Raghavan et al. | |
| 2016/0286406 A1 | 9/2016 | Kamimura | |
| 2017/0054470 A1* | 2/2017 | Reza | H04W 24/02 |
| 2017/0064667 A1* | 3/2017 | Mycek | G01S 5/02 |
| 2017/0318522 A1* | 11/2017 | Ly | H04L 5/0048 |
| 2018/0084555 A1* | 3/2018 | Mori | H04B 7/00 |
| 2019/0007810 A1* | 1/2019 | Santavicca | H04B 17/318 |
| 2019/0020524 A1* | 1/2019 | Finkelstein | H04L 27/2646 |
| 2019/0028167 A1* | 1/2019 | Chang | H04B 7/0413 |
| 2019/0044949 A1* | 2/2019 | Bartfai-Walcott | |
| | | | H04W 12/00506 |
| 2019/0230548 A1* | 7/2019 | Akdeniz | H04W 64/003 |
| 2019/0286901 A1* | 9/2019 | Blanco | G08B 13/19697 |
| 2019/0288755 A1* | 9/2019 | Li | H04B 17/382 |
| 2019/0339885 A1* | 11/2019 | Yanagihara | G06F 3/0631 |
| 2019/0391251 A1* | 12/2019 | Bharadwaj, Jr. | G01S 13/583 |
| 2020/0012274 A1* | 1/2020 | Kamiya | B66F 9/07581 |
| 2020/0074993 A1* | 3/2020 | Lee | G10L 15/1822 |
| 2020/0134934 A1* | 4/2020 | Covington | G07C 5/0816 |
| 2020/0169967 A1* | 5/2020 | Yu | H04B 17/318 |
| 2020/0186970 A1* | 6/2020 | Dekovich | H04W 24/10 |
| 2020/0193297 A1* | 6/2020 | Verhoef | G06F 17/18 |
| 2020/0201735 A1* | 6/2020 | Livoti | G06F 11/0748 |
| 2020/0271747 A1* | 8/2020 | Wu | G01P 15/18 |
| 2020/0293889 A1* | 9/2020 | Terasaki | G06N 3/08 |
| 2020/0302273 A1* | 9/2020 | Chung | G06N 3/0472 |
| 2020/0375785 A1* | 12/2020 | Hansen | A61F 2/64 |
| 2020/0380326 A1* | 12/2020 | Kawaguchi | G06K 19/0709 |

* cited by examiner

DYNAMIC THRESHOLDS FOR ANTENNA SWITCHING DIVERSITY

FIELD OF THE INVENTION

The following relates generally to wireless communications and more specifically to an improved threshold for antenna switching diversity (ASDIV).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some UEs may implement an ASDIV feature to switch from operating on one antenna to another antenna. For example, a UE may include multiple antennas for communication (e.g., two antennas, four antennas, etc.) and may operate using an active antenna (e.g., on the uplink, on the downlink, or both). In some cases, based on a current measurement for the active antenna, the UE may switch to operate using a different antenna. Antenna switching may allow the UE to support reliable transmissions in the wireless communications system.

SUMMARY

The described techniques relate to improved methods, systems, devices, and apparatuses that support dynamic thresholds for antenna switching diversity (ASDIV). Generally, the described techniques provide for reliable communications by switching an operating antenna based on a dynamic threshold. The dynamic threshold may improve the percentage of time that a device, such as a user equipment (UE), operates using an "optimal" antenna (e.g., an antenna with the highest reference signal received power (RSRP), an antenna using the least transmit power, etc.) while reducing the number of antenna switches as compared to a static threshold. For example, a UE may communicate with another wireless device (e.g., another UE, a base station, etc.) using a first antenna of a set of antennas. The UE may track a communication measurement for the first antenna (e.g., an RSRP value, a transmit power, etc.) and may perform an antenna switching test based on the current communication measurement. For the antenna switching test, the UE may update the dynamic threshold based on a machine learning agent unit. The machine learning agent unit may be trained specific to a user of a UE, a UE, a type of UE, a chipset, or some combination of these, and the machine learning agent unit may include a neural network for determining the updated dynamic threshold. The UE may perform a comparison with the dynamic threshold and determine whether to switch the operating antenna based on the comparison.

DETAILED DESCRIPTION

Figure 1:
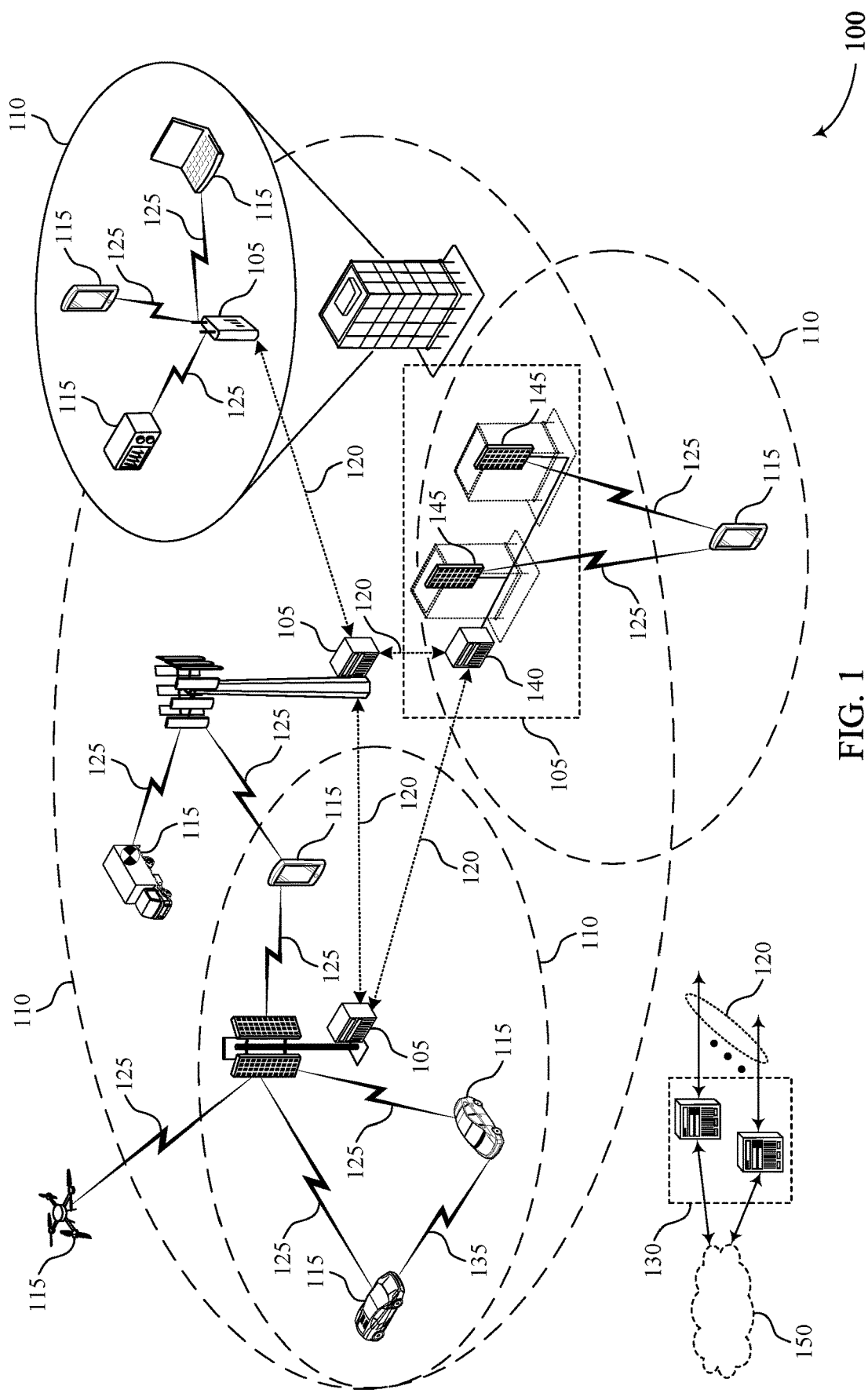
FIGS. 1 through 3 illustrate examples of wireless communications systems that support dynamic thresholds for antenna switching diversity (ASDIV) in accordance with aspects of the present disclosure.

In some wireless communications systems, a wireless device, such as a user equipment (UE), may implement antenna switching to support reliable communications. For example, a UE may include an antenna switching diversity (ASDIV) feature to control switching from operating on a first antenna of the UE to operating on a second antenna of the UE. In some cases, the UE may determine one or more current communication measurements for one or more antennas and may determine whether to switch the active antenna based on the current communication measurement(s). In a first case, the UE may determine whether to switch active antennas based on reference signal received powers (RSRPs) for a set of antennas at the UE. In a second case, the UE may determine whether to switch active antennas based on a transmit power used for transmissions by the active antenna. The antenna switching decision at the UE may be based on an antenna switching threshold.

Some UEs may implement a static threshold for antenna switching. For example, the UEs may be configured with static thresholds and each UE may compare a current communication measurement to a respective static threshold. In one example, a UE may compare a difference in RSRP values for two antennas to the static threshold and may switch active antennas if the difference is greater than or equal to the static threshold (e.g., where the active antenna's RSRP is significantly less than the RSRP for another antenna of the UE). However, the static threshold may be selected to support a specific use case and/or environment, rather than multiple different use cases and/or environments. Accordingly, the static threshold may result in inefficient performance in different use cases, different environments, or changing wireless communications systems. For example, the static threshold may result in a relatively low percentage of time spent on an "optimal" antenna (e.g., an antenna with the highest RSRP value or using the lowest transmit power for transmission for a set of antenna candidates) for a UE in certain environments.

To support efficient antenna switching, a UE may implement a dynamic antenna switching threshold. When a UE performs an antenna switching test (e.g., if the UE determines that it is not operating using an "optimal" antenna for a measurement interval), the UE may update the dynamic threshold based on one or more operating conditions of the UE. For example, if the active antenna consistently remains "non-optimal" by a relatively small margin, the UE may lower the dynamic threshold to allow for an antenna switch to a more "optimal" antenna (e.g., despite a small difference in RSRPs for the antennas). Conversely, if the "non-optimal" antenna is an outlier, the UE may increase the dynamic threshold to avoid an inefficient antenna switch. The UE may determine whether to switch the active antenna based on the updated dynamic threshold value and may communicate with another wireless device according to the switching decision.

In some cases, the dynamic antenna switching threshold may be determined using a machine learning agent unit containing a trained neural network. The neural network may be trained to output a dynamic threshold value that results in efficient antenna switching procedures. In some cases, the neural network may undergo further training online at the UE for further configuration to a specific environment or specific operating conditions of the UE. The neural network may receive current communication measurements as input (e.g., a difference in RSRP values for antennas) and may output probabilities associated with multiple potential threshold values. The threshold value corresponding to the highest output probability may be selected as the updated dynamic threshold, and the UE may use this updated threshold value for determining whether to switch from the currently active antenna to a different, more "optimal" antenna (e.g., an antenna with a higher current RSRP value).

Aspects of the disclosure are initially described in the context of wireless communications systems. Additional aspects are described with reference to a machine learning agent unit (e.g., training, nodes, decisions, etc.) and an antenna switching procedure. Aspects of the disclosure are further illustrated by and described with reference to apparatus diagrams, system diagrams, and flowcharts that relate to dynamic thresholds for ASDIV using a machine learning agent unit.

FIG. 1 illustrates an example of a wireless communications system 100 that supports dynamic thresholds for ASDIV in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g. synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems 100, a UE 115 may communicate with another wireless device (e.g., another UE 115, a base station 105, etc.) using a first antenna of a set of antennas. The UE 115 may track a communication measurement for the first antenna (e.g., an RSRP value, a transmit power, etc.) and may perform an antenna switching test based on the current communication measurement. For the antenna switching test, the UE 115 may update a dynamic threshold based on a machine learning agent unit. The machine learning agent unit may be trained specific to a user of a UE 115, a UE 115, a type of UE 115, a chipset, or some combination of these, and the machine learning agent unit may include a neural network for determining the updated dynamic threshold. The UE 115 may perform a comparison with the dynamic threshold and determine whether to switch the operating antenna based on the comparison. For example, the UE 115 may determine an RSRP difference between a second antenna and the active antenna and may switch from the active antenna to the second antenna if the RSRP difference is greater than or equal to the determined dynamic threshold value.

Figure 2:
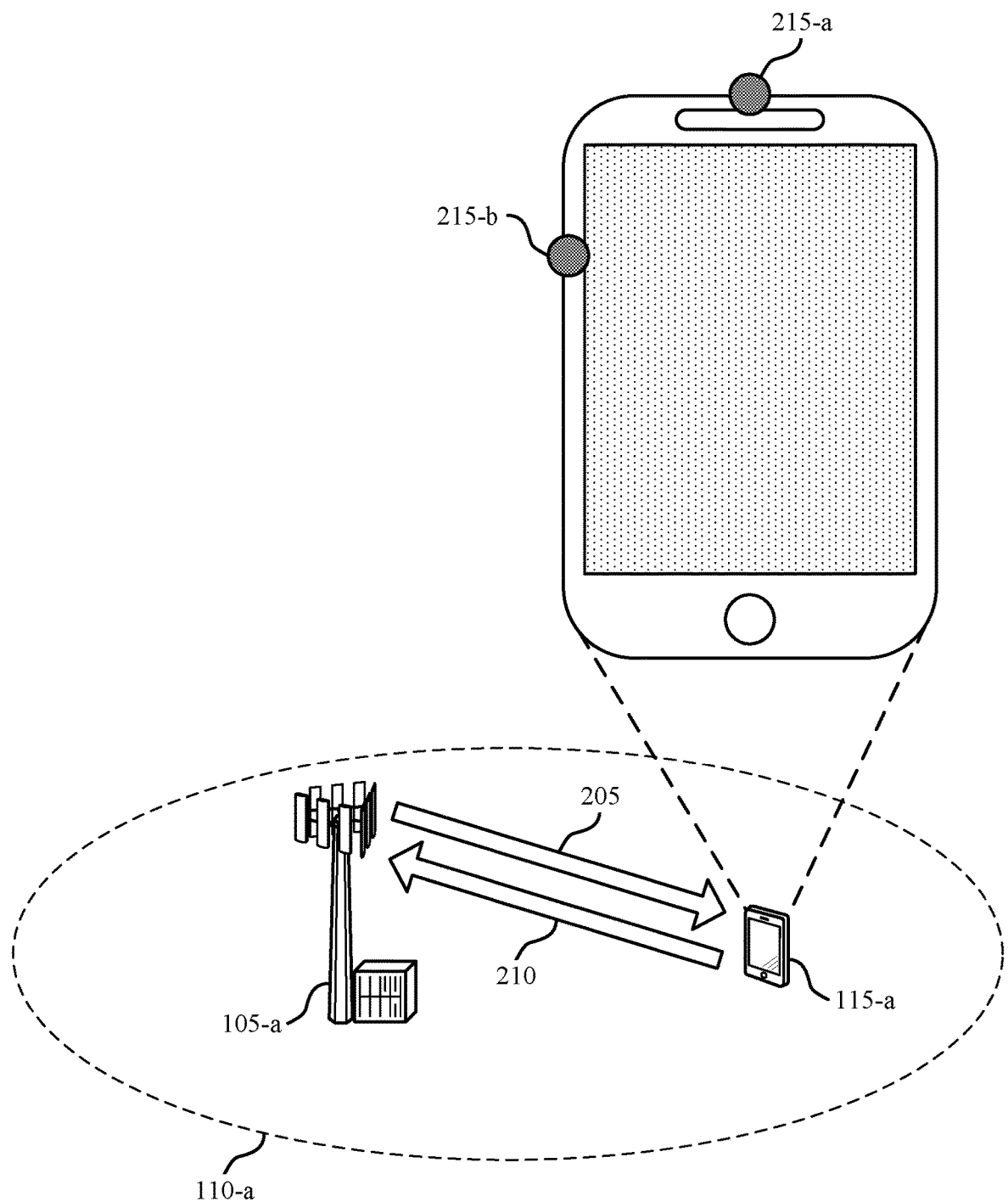

FIG. 2 illustrates an example of a wireless communications system 200 that supports dynamic thresholds for ASDIV in accordance with aspects of the present disclosure.

The wireless communications system 200 may include UE 115-a and base station 105-a, which may be examples of the corresponding devices described with reference to FIG. 1. Base station 105-a may provide service for geographic coverage area 110-a as described with reference to FIG. 1. UE 115-a may communicate with other wireless devices (e.g., including base station 105-a) using a set of antennas, where one antenna 215 of the set of antennas may be activated for communications. In some cases, based on downlink channel 205 reception, UE 115-a may select an antenna 215 for uplink channel 210 transmission. Switching an operating antenna (e.g., from a first antenna 215-a to a second antenna 215-b) may be performed by an ASDIV feature of UE 115-a.

A UE 115 may include an ASDIV feature deployed in the chipset of the UE 115. The ASDIV feature may manage antenna 215 selection for communication. In some cases, a UE 115, such as UE 115-a, may include two antennas 215 for communication (e.g., antennas 215-a and 215-b). These antennas 215 may be examples of logical antennas, physical antennas, antenna ports, etc. In other cases, a UE 115 may include any number of antennas 215 for communication (e.g., four antennas for some 5G-capable UEs 115). The UE 115 may switch between the antennas 215 for communication according to an antenna switching threshold and one or more current communication measurements.

In a first example, UE 115-a may perform antenna switching based on RSRP values for the antennas 215. For example, UE 115-a may communicate with base station 105-a using a first antenna 215-a. Additionally, UE 115-a may measure RSRP values for the first antenna 215-a and the second antenna 215-b for communications with base station 105-a. If a first RSRP value for the first antenna 215-a is lower than a second RSRP value for the second antenna 215-b, UE 115-a may determine that the second antenna 215-b is currently the "optimal" or "best" antenna 215 for communication with base station 105-a (where the "optimal" or "best" antenna 215 is the antenna 215 of the set of antennas with the highest current RSRP measurement). However, rather than simply switching to the second antenna 215-b, UE 115-a may perform an antenna switching test by comparing the difference in RSRP values between the antennas 215 to the antenna switching threshold, which may be an example of an RSRP difference threshold. If the difference in RSRP values (e.g., the RSRPΔ) between the second antenna 215-b—the antenna with the greatest current RSRP value—and the first antenna 215-a—the current operating antenna—is greater than the antenna switching threshold, UE 115-a may switch from operating using the first antenna 215-a to operating using the second antenna 215-b. Alternatively, if the RSRPΔ is less than or equal to the antenna switching threshold, UE 115-a may stay on the same antenna 215 (e.g., continue operating using the first antenna 215-a).

In a second example, UE 115-a may perform antenna switching based on transmit powers for the antennas 215. For example, UE 115-a may determine the current transmit power used for communicating with the operating antenna 215-a (e.g., to achieve a certain signal-to-interference-and-noise ratio (SINR)). If the current transmit power exceeds a threshold transmit power (e.g., a maximum transmit power, such as 23 decibel-milliwatts (dBm)), UE 115-a may perform an antenna switching test. The antenna switching test may involve comparing the difference in transmit power values between the antennas 215 to the antenna switching threshold, which may be an example of a transmit power difference threshold. If the difference in transmit power values needed for transmission over the channel (e.g., for a given SINR on the uplink channel 210) between the first antenna 215-a—the current operating antenna—and the second antenna 215-b—the antenna with the least current transmit power needed—is greater than the antenna switching threshold, UE 115-a may switch from operating using the first antenna 215-a to operating using the second antenna 215-b.

In some cases, UE 115-a may periodically determine whether to switch an operating antenna 215. For example, UE 115-a may determine whether to perform an antenna switching test every 640 milliseconds (ms). The determination may be based on the current communication measurement for that periodic time period. In a first example, the current communication measurement may be measured every 640 ms for the corresponding periodic time period. In a second example, UE 115-a may measure the current communication measurement throughout the 640 ms period and may average the measurements to determine the current communication measurement for that periodic time period. The periodicity of these measurement cycles may be static or dynamic (e.g., based on channel conditions). In some examples, the current communication measurement may be antenna-specific. For example, for a single measurement cycle, UE 115-a may determine a first current communication measurement for a first antenna 215-a and a second current communication measurement for a second antenna 215-b. As described herein, UE 115-a may determine whether to perform the antenna switching test based on the current communication measurement for the active antenna 215 (e.g., the first current communication measurement for the first antenna 215-a).

The ASDIV feature may allow UE 115-a to switch antennas if the performance of the currently active antenna 215 degrades. For example, an antenna 215 may have a low reliability or throughput based on a physical orientation of UE 115-a and/or the antenna 215, obstruction of the antenna 215 (e.g., based on how a user holds or operates the UE 115-a), time-based interference (e.g., bursty interference) on the channel, or a combination of these or similar circumstances. Accordingly, the ASDIV feature may allow UE 115-a to switch to the "optimal" antenna while performing a relatively low number of antenna switches, as antenna switches may result in transmission inefficiencies. For example, the signaling throughput of the UE 115-a may decrease at an antenna switch, and some UEs 115 may experience a voltage spike in the current during the antenna switch (e.g., depending on a frequency band used by the UE 115). Accordingly, an "optimal" antenna switching threshold may maximize use of the "best" antenna (e.g., the antenna 215 with the highest current RSRP value) while minimizing the number of antenna switches.

Some systems may implement a static antenna switching threshold for UEs 115. The static threshold may be selected by the original equipment manufacturer (OEM) of the UE 115 and pre-configured at the UE 115. In some cases, the static threshold is determined based on lab and/or field testing and may be different for each operator and/or OEM (e.g., ranging from approximately 4 decibels (dB) to 11 dB). However, these static thresholds may be inefficient in certain systems, and the threshold value may become outdated as the systems change (e.g., with increasing numbers of antennas, UEs 115, etc.). In some cases, a static antenna switching threshold may result in a UE 115 operating using the "best" antenna (e.g., the antenna with the highest current RSRP value) approximately 50% of the time or less.

In contrast, UE 115-*a* of the wireless communications system 200 may implement a dynamic antenna switching threshold. In some cases, a machine learning agent unit at UE 115-*a* may modify the dynamic antenna switching threshold value. The machine learning agent unit may be developed prior to deployment in the UE 115-*a*, where different decisions (e.g., antenna switching decisions, threshold value decisions, etc.) may be rewarded or penalized to construct a neural network for updating the threshold. For example, operating on the "optimal" antenna 215 (e.g., the antenna 215 with the highest RSRP value) may be rewarded, while operating on a "non-optimal" antenna 215 (e.g., an antenna 215 without the highest RSRP value) or switching too often (e.g., more frequently than an ASDIV using a static threshold would switch) may be penalized. The neural network may be trained using training data corresponding to many different environments, scenarios, and use cases (e.g., 4G network data, 5G network data, carrier aggregation data, MIMO data, etc.), such that the ASDIV may adapt to or handle different conditions in a wireless communications system 200. In some cases, the machine learning agent unit may additionally or alternatively be trained following deployment in UE 115-*a* or trained for a specific environment, such that the machine learning agent unit may dynamically adjust to a specific user, model, chipset, network, and/or operating band. Implementing the dynamic antenna switching threshold based on the machine learning agent unit, as opposed to implementing a static threshold, may increase the use of the antenna with the highest RSRP value, improving the ASDIV feature performance. Furthermore, the machine learning agent unit may accelerate threshold tuning and decrease testing costs (e.g., field-based testing costs) by implementing a dynamic threshold.

Some systems may support flexible training deployment for the machine learning agent unit, where training may be performed at different levels or at different times. For example, machine learning training may be performed to identify a universal dynamic threshold for all UEs 115 implementing a dynamic antenna switching threshold (e.g., based on moment tensor potentials (MTPs)). In other examples, machine learning training may be performed during chipset and/or model testing to identify a dynamic threshold per chipset, a dynamic threshold per UE model, or a combination thereof. In yet other examples, a dynamic threshold may be determined and deployed at UE 115-*a*, and training may continue at UE 115-*a* to converge on a user-specific dynamic threshold for UE 115-*a*. In some cases, training at a UE 115 may be activated or deactivated based on certain conditions (e.g., the performance of the machine learning agent unit, a training schedule, etc.). In some cases, the machine learning agent unit may support operations in addition to or alternative to ASDIV functionality. For example, the machine learning agent unit may support determining a mode of operation (e.g., a radio access technology to implement), a technology feature to implement, a radio frequency (RF) power to use, a radio link failure (RLF) prediction, or some combination of these or other learned determinations.

In some implementations, the wireless communications system 200 may use a dynamic antenna switching threshold based on a heuristic or a configured threshold-switching pattern or algorithm. For example, UE 115-*a* may store a set of threshold values and may be configured to switch between the set of threshold values based on one or more current communication parameters. For example, UE 115-*a* may select a dynamic threshold value based on a number of antenna switching tests performed by the UE 115-*a* (e.g., in consecutive measurement periods, within a given time window, etc.). UE 115-*a* may be pre-configured to select a lower dynamic switching threshold based on a greater number of antenna switching tests performed within a time window and to select a greater dynamic switching threshold based on a lower number of antenna switching tests performed within the time window. Such an algorithm may or may not be based on machine learning (e.g., the algorithm may be based on a heuristic, empirical observation, a standardized switching procedure, etc.).

The dynamic threshold implemented by UE 115-*a* may reduce the transmit power used for transmissions while improving the RSRP, reference signal received quality (RSRQ), received signal strength indicator (RSSI), SNR, or some combination of these as compared to a static threshold implementation. In some cases, the dynamic antenna switching threshold may result in a UE 115 operating using the "optimal" antenna 215 (e.g., the antenna 215 with the highest current RSRP value) approximately 95% of the time with around the same number of antenna switches as the static threshold implementation. Furthermore, the processing cost for UE 115-*a* to run the machine learning agent unit may be negligible. The benefits of an antenna switch may include improving signaling throughput following a switch (e.g., as compared to the measurement period preceding the switch) and reducing transmit power (e.g., physical uplink shared channel (PUSCH) transmitting power) following a switch (e.g., to achieve a same SINR), improving power consumption at UE 115-*a*.

Figure 3:
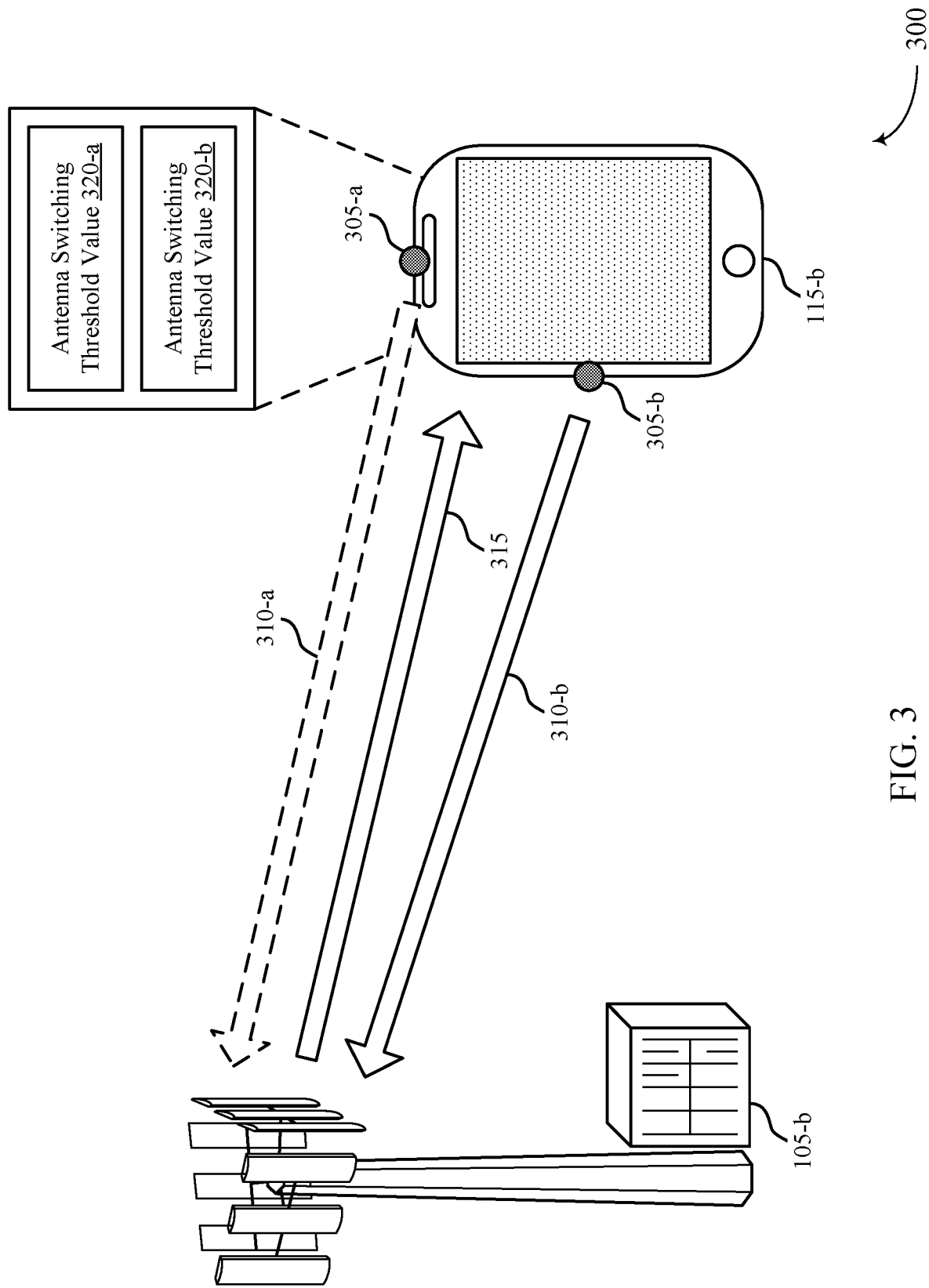

FIG. 3 illustrates an example of a wireless communications system 300 that supports dynamic thresholds for ASDIV in accordance with aspects of the present disclosure. The wireless communications system 300 may include UE 115-*b* and base station 105-*b*, which may be examples of the corresponding devices described with reference to FIGS. 1 and 2. UE 115-*b* may communicate with other wireless devices (e.g., including base station 105-*b*) using a set of antennas, where one antenna 305 may be the active antenna. In some cases, based on communication measurements, UE 115-*b* may select an antenna 305 for uplink signaling 310. Switching the active antenna (e.g., from a first antenna 305-*a* to a second antenna 305-*b*) may be performed by an ASDIV feature of UE 115-*b* using a dynamic threshold.

For example, UE 115-*b* may communicate on the uplink with base station 105-*b* using an active antenna 305-*a*. UE 115-*b* may transmit uplink signaling 310-*a* using the active antenna 305-*a* during a first time period. However, at a later time, UE 115-*b* may determine to perform an antenna switching test based on a current communication measurement. This current communication measurement may be measured by the active antenna 305-*a* (e.g., a "first" current communication measurement for the "first" antenna 305-*a*) or by another antenna 305 or receiving component. In some cases, the current communication measurement may be an example of a measurement performed on downlink signaling 315, such as a physical downlink shared channel (PDSCH), one or more downlink reference signals, or any combination of these or other downlink signals. In other cases, the current communication measurement may be an example of a measurement of transmitted power using a different antenna 305, a different receive path, a feedback receiver, or some combination of these. For example, a feedback receiver may measure the transmit power of the uplink signaling 310-*a* for the active antenna 305-*a*.

UE 115-*b* may update a dynamic threshold based on the current communication measurement. For example, UE 115-b may update from an antenna switching threshold value 320-a to an antenna switching threshold value 320-b. In some cases, UE 115-b may store indications of multiple possible antenna switching threshold values 320 and/or may select a threshold value to use for ASDIV based on a lookup table, a function, an algorithm, a heuristic, a neural network, or some combination of these. UE 115-b may determine whether to switch the active antenna 305 (e.g., from a first antenna 305-a to a second antenna 305-b) based on a comparison between the updated dynamic threshold and a comparison value. For example, UE 115-b may calculate the comparison value based on one or more current communication measurements and may compare this comparison value to the updated antenna switching threshold value 320-b. Based on the comparison, UE 115-b may switch from operating on antenna 305-a to operating on antenna 305-b. UE 115-b may communicate with base station 105-b using active antenna 305-b (e.g., the "second" antenna 305-b) based on the antenna switch. For example, UE 115-b may transmit uplink signaling 310-b using the active antenna 305-b during a second time period following the antenna switch.

Figure 4:
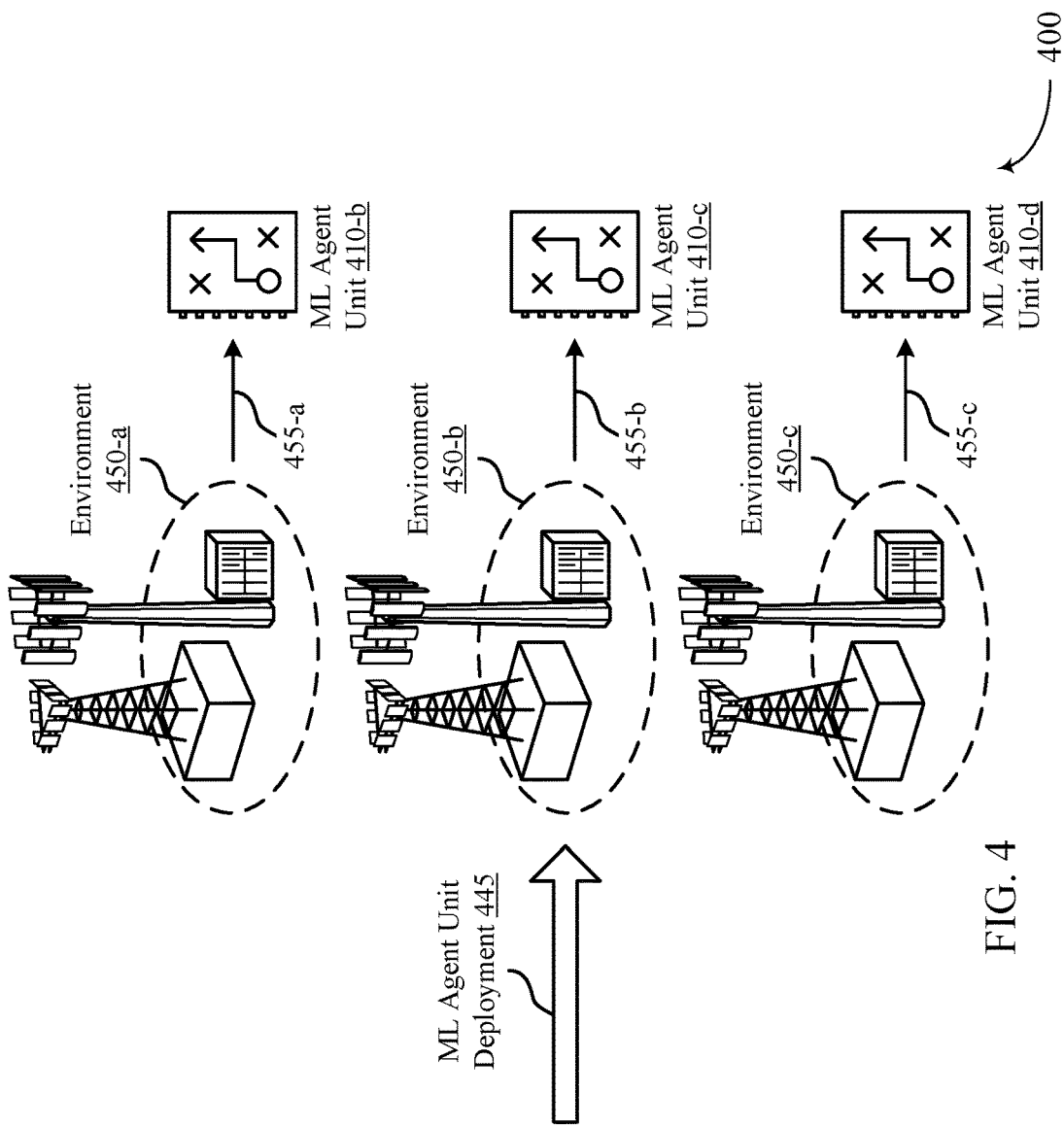
FIG. 4 illustrates an example of machine learning agent unit training that supports dynamic thresholds for ASDIV in accordance with aspects of the present disclosure.

FIG. 4 illustrates an example of machine learning agent unit training 400 that supports dynamic thresholds for ASDIV in accordance with aspects of the present disclosure. The machine learning agent unit training 400 may be split into two portions, pre-deployment training 405-a and post-deployment training 405-b. In some cases, the machine learning agent unit training 400 may involve either pre-deployment training 405-a or post-deployment training 405-b, or the machine learning agent unit training 400 may involve some combination of the two. The pre-deployment training 405-a may be performed using training data, while the post-deployment training 405-b may be performed by a wireless device, such as a UE 115 as described with reference to FIGS. 1 through 3. The machine learning agent unit training 400 may determine a dynamic antenna switching threshold for ASDIV at a UE 115.

The pre-deployment training 405-a may determine a machine learning agent unit 410-a using an environmental simulator 415. A machine learning agent unit 410 or its sub-components may be implemented in hardware, code (e.g., software or firmware) executed by a processor, or any combination thereof. If implemented in code executed by a processor, the functions of the machine learning agent unit 410 or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. In some cases, the pre-deployment training 405-a may be referred to as single time machine learning agent unit training or offline machine learning agent unit training. In the pre-deployment training 405-a, a machine learning agent unit 410-a may be tested using training data. In a specific example, this training data may be based on a log of calls performed in different mobility scenarios. For example, the calls for each device may be organized into "mobile" calls (e.g., where the speed of the device is greater than or equal to 5 kilometers per hour (km/h)), "stationary" calls (e.g., where the speed of the device is less than 5 km/h), "majority stationary" calls (e.g., where the speed measured for the device fluctuated above and below 5 km/h, with a majority of the measurements below 5 km/h), and "not reported" calls (e.g., where speed information is not determined for the device). The calls may further be organized by provider. These calls may result in a high variability in the average "optimal" antenna switching threshold. For each call, the data may indicate the average throughput for each measurement interval, the average PUSCH transmit power for each measurement interval, and the average RSRP, RSRQ, RSSI, SNR, or some combination of these for each measurement interval. Other data may be simulated for the training data. This training data (e.g., existing logged calls, simulated calls, etc.) may support a simulated environment with simulated environment statuses for initial tuning of the machine learning agent unit 410-a.

For example, the machine learning agent unit 410-a may be tested using the environment simulator 415 and revised based on a scoring function 420. In some cases, the machine learning agent unit 410-a may get an environment status from the environment simulator 415 (e.g., at 425). The environment status may include current antenna measurements, channel conditions, signals, nearby obstructions and/or devices, or some combination of these (e.g., based on the training data). At 430, the machine learning agent unit 410-a may make a decision (e.g., determine an action to perform) based on the environment status. The environment simulator 415 may evaluate the action at 435 and determine a scoring function 420 based on the evaluation. At 440, the scoring function 420 may assign rewards and/or penalties to the machine learning agent unit 410-a based on the action evaluation. The machine learning agent unit 410-a may be updated based on the rewards and/or penalties, such that if the machine learning agent unit 410-a encounters similar conditions in the future, the machine learning agent unit 410-a is more likely to select a favorable action (e.g., an action resulting in efficient communications at a UE 115).

In one specific example, the pre-deployment training 405-a may train a neural network at the machine learning agent unit 410-a to determine a dynamic antenna switching threshold value. For example, at 425, the machine learning agent unit 410-a may receive an environment status indicating RSRP values for a measurement period for a set of antennas of a UE 115. Based on the current neural network at the machine learning agent unit 410-a, the machine learning agent unit 410-a may determine a value for a dynamic antenna switching threshold and may determine whether to switch the active antenna from a first antenna to a second antenna based on the threshold value and the environment status. At 430, the machine learning agent unit 410-a may send an indication of an action to perform based on the determination (e.g., whether to switch the active antenna or stay on the same active antenna). At 435, the environment simulator 415 may evaluate the action. For example, the environment simulator 415 may determine whether the action resulted in a higher RSRP value for the active antenna than other potential actions, and the environment simulator 415 may determine a scoring function 420 based on the determination. In one example, the scoring function 420 may reward switching antennas if the action results in a significantly higher RSRP value for the active antenna than staying on the same antenna. However, the scoring function 420 may penalize switching antennas if the new active antenna has a lower RSRP value, and switching the operating antenna may incur a cost based on the inherent inefficiency of antenna switching. Using the scoring function 420, the machine learning agent unit 410-a may update the neural network at 440, where weights of the neural network are modified based on evaluating the actions performed due to the neural network's output. For example, if an antenna switch was performed based on a relatively low dynamic threshold output by the neural network, and the evaluation indicates that the switch was inefficient (e.g., due to minimal RSRP benefits from switching active antennas), the machine learning agent unit 410-*a* may modify weights of the neural network such that the same or similar environment status may result in a relatively higher dynamic threshold in the future. This relatively higher dynamic threshold may cause the machine learning agent unit 410-*a* to determine to stay on an active antenna if the same environmental conditions are met.

In some cases, the training described herein may be based on one or more policies. These policies may be defined by a user supervising the training or based on preferred results (e.g., results associated with efficient antenna usage). Each decision by the machine learning agent unit 410-*a* (e.g., each action selected) may receive a score based on at least one policy of the set of policies. Gradients may be computed according to the scores (e.g., after a number of decisions by the machine learning agent unit 410-*a*), and the neural network weights may be updated according to the gradients. The machine learning agent unit 410-*a* may continue to adapt in order to maximize or meet the policies. In some cases, the policies may be turned off and further training (e.g., online training) may be based on measurements or metrics.

Following the pre-deployment training 405-*a*, the trained machine learning agent unit 410-*a* may be deployed in one or more wireless devices (e.g., UEs 115) at 445. The wireless devices may be operated using the trained machine learning agent unit 410-*a*. In some cases, to optimize or improve performance of the machine learning agent unit 410-*a* in different environments 450, post-deployment training 405-*b* may be performed at a UE 115. The environment-specific training may be done independently by specific machine learning agent units 410. Different environments 450 may include indoor environments, outdoor environments, different users operating a device, mobile environments (e.g., in vehicles), stationary environments, or any combination of these or other environments affecting the machine learning agent unit's accuracy. In some cases, post-deployment training 405-*b* may be referred to as online training, and a machine learning agent unit 410 determined based on online training may be referred to as a machine learning agent, machine learning agent component, a smart agent, a smart agent unit, or some similar terminology.

Each UE 115 (e.g., every UE 115, each UE 115 with a same chipset, each UE 115 of a same UE type, etc.) may be configured with a same trained machine-learning agent unit 410-*a*. Starting with a same trained neural network, each UE 115 employing post-deployment training 405-*b* may update the neural network according to an environment 450 that the UE 115 operates within. For example, a first UE 115 may train the neural network based on a first environment 450-*a* and may update the machine learning agent unit at 455-*a* to obtain a machine learning agent unit 410-*b* trained specifically for environment 450-*a*. Similarly, a second UE 115 may update the machine learning agent unit at 455-*b* to obtain a machine learning agent unit 410-*c* trained specifically for environment 450-*b*, and a third UE 115 may update the machine learning agent unit at 455-*c* to obtain a machine learning agent unit 410-*d* trained specifically for environment 450-*c*. Based on the environment specific-training, the same conditions or measurements may result in different decisions and/or actions for machine learning agent units 410-*b* and 410-*c* (e.g., trained according to different environments 450). For example, the same RSRP measurements may result in different dynamic thresholds and different antenna switching decisions in different environments 450, such as for an urban environment versus a rural environment, for a stationary environment versus a highly mobile environment, or for different users with differing user behaviors. In at least one embodiment, a single UE 115 may train a plurality of different neural networks, each for a different combination of users, environments (e.g., geographic locations), carrier frequencies, or the like. Thus, the UE 115 may select one of the available neural networks for training or use based on a current user, environment, carrier, or other factor.

Post-deployment training 405-*b* may allow a UE 115 to adapt to a specific user or a specific frequent environment, improving the antenna switching performance of the UE 115. Post-deployment training 405-*b* may also allow a machine learning agent unit 410 to relearn "optimal" behaviors if the UE 115 moves to a new environment 450. In one specific example, a mobile phone used by a first user may perform post-deployment training 405-*b* to tune a neural network based on how the first user holds the mobile phone (e.g., certain antennas may be obstructed due to the specific grip of the first user, the hand size of the first user, etc.). If the first user sells the mobile phone to a second user, post-deployment training 405-*b* may again be performed to re-tune the neural network to how the second user holds the mobile phone. In some cases, the post-deployment training 405-*b* may occur continuously or periodically according to a training schedule. In other cases, the post-deployment training 405-*b* may be triggered based on a machine learning agent unit metric. For example, training may be activated at a UE 115 if one or more performance metrics degrade (e.g., a number of antenna switches exceeds a threshold value for a certain time period, an amount of time operating using the antenna with the highest RSRP value is below a threshold value for a certain time period, etc.), which may indicate a change in the operating environment 450 of the UE 115. In the specific example described above, the second user receiving and operating the mobile phone may trigger post-deployment training 405-*b* due to different communication measurements (on average) at the antennas based on the second user holding the mobile phone differently than the first user.

In some cases, the machine learning agent unit training 400 may improve antenna switching performance in a matter of hours (e.g., where the hours may represent call lengths that the machine learning agent unit 410 goes through). In a specific example, within 14 hours, the machine learning agent unit training 400 may result in a dynamic threshold algorithm that performs comparably to a static threshold. Within 22 hours, the machine learning agent unit training 400 may result in a dynamic threshold algorithm that outperforms the static threshold.

Figure 5:
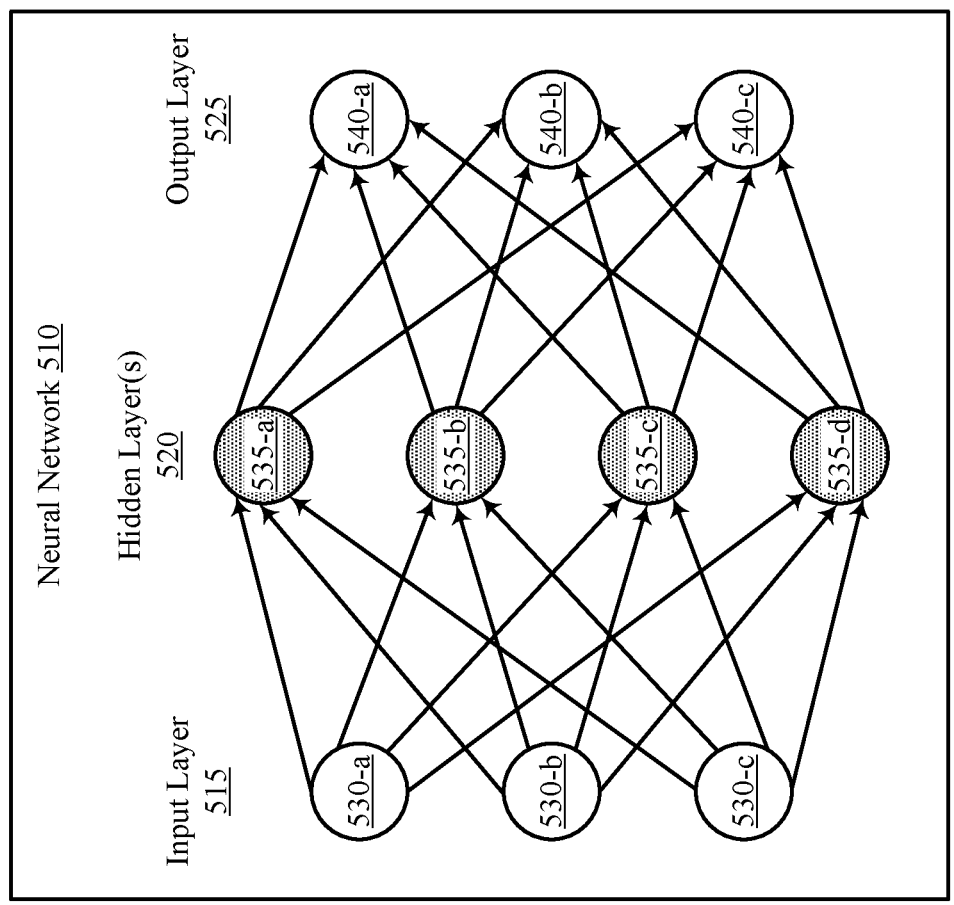
FIG. 5 illustrates an example of a machine-learned model that supports dynamic thresholds for ASDIV in accordance with aspects of the present disclosure.

FIG. 5 illustrates an example of a machine-learned model 500 that supports dynamic thresholds for ASDIV in accordance with aspects of the present disclosure. The machine-learned model 500 may be implemented at a wireless device, such as a UE 115 as described with reference to FIGS. 1 through 3. The machine-learned model 500 may include a neural network 510, where the weights between nodes of the neural network 510 may be determined according to machine learning agent unit training 400 as described with reference to FIG. 4. In some cases, the neural network 510 may support ASDIV by determining a dynamic threshold for antenna switching.

The neural network 510 may include an input layer 515, one or more hidden layers 520, and an output layer 525. In a fully connected neural network with one hidden layer 520, each hidden layer node 535 may receive a value from each input layer node 530 as input, where each input is weighted.

These neural network weights may be based on a cost function that is revised during training of the neural network 510. Similarly, each output layer node 540 may receive a value from each hidden layer node 535 as input, where the inputs are weighted. If training of the neural network 510 is complete, the neural network 510 may be represented using matrix operations according to the input values 505 and the determined weights. For example, the hidden values may be calculated according to:

$$[\text{Input}] * [\text{Input Hidden Weights}] = f([\text{Hidden}]), \quad (1)$$

where $$f(x) = \begin{cases} 0, & x < 0 \\ x, & x \geq 0 \end{cases}, \quad (2)$$

[Input] is an array of dimension k for k input values corresponding to the input value 505 to the neural network 510, [Input Hidden Weights] is a matrix of dimensions k×n for n hidden nodes corresponding to the input-to-hidden weights determined for the neural network 510, and [Hidden] is an array of dimension n corresponding to the calculated values at the hidden layer 520. Similarly, the output values may be calculated according to:

$$[\text{Hidden}] * [\text{Output Hidden Weights}] = s(f([\text{Output}])), \quad (3)$$

where $$s(x) = \frac{e^{x_i}}{\sum_{i=1,m} e^{x_i}}, \quad (4)$$

[Output Hidden Weights] is a matrix of dimensions n×m for m output nodes corresponding to the hidden-to-output weights determined for the neural network 510, and [Output] is an array of dimension m corresponding to the output of the neural network 510. This computational implementation may be stored in memory and used by a UE 115 (e.g., if post-deployment training is not supported for the UE 115).

If post-deployment training (e.g., online training) is supported at the UE 115, the UE 115 may allocate memory to store errors and/or gradients for reverse matrix multiplication. These errors and/or gradients may support updating the neural network 510 based on output feedback. Training the neural network 510 may support computation of the weights (e.g., connecting the input layer nodes 530 to the hidden layer nodes 535 and the hidden layer nodes 535 to the output layer nodes 540) to map an input pattern to a desired output outcome.

In one specific example, the neural network 510 may support dynamic selection of an antenna switching threshold for ASDIV. A UE 115 containing the machine-learned model 500 may perform communication measurements during a measurement cycle (e.g., 640 ms). At the end of a measurement cycle, the UE 115 may determine a percentage of time that the UE 115 was operating using the "best" antenna (e.g., according to some measurement criteria). If, during the measurement cycle, the UE 115 operated on the "best" antenna for greater than or equal to a threshold percentage of time (e.g., 50% of the measurement cycle), the UE 115 may not perform an antenna switching test and, correspondingly, may not update a dynamic threshold using the neural network 510. However, if the UE 115 operated on the "best" antenna for less than the threshold percentage of time, the UE 115 may perform an antenna switching test. To perform the antenna switching test, the UE 115 may update the dynamic threshold using the neural network 510.

The UE 115 may send an input value 505 to the neural network 510 for processing. In some cases, the input value 505 may be an average difference in RSRP values between an antenna with the greatest average RSRP value for the measurement cycle and the operating antenna for the measurement cycle (e.g., where the input may be referred to as the average RSRPΔ for the measurement cycle). The input value 505 may be converted into a set of k input layer nodes 530 at the input layer 515. In some cases, different measurements may be input at different input layer nodes 530 of the input layer 515. In other cases, the average RSRPΔ for the measurement cycle may be converted into an array of values corresponding to the nodes (e.g., an average RSRPΔ decimal value may be converted into a binary value, where each bit of the binary value is assigned to an input layer node 530 of the input layer 515). Some input layer nodes 530 may be assigned default values (e.g., values of 0) if the number of input layer nodes 530 exceeds the number of inputs corresponding to the input value 505. As illustrated, the input layer 515 may include three input layer nodes 530-a, 530-b, and 530-c. However, it is to be understood that the input layer 515 may include any number of input layer nodes 530 (e.g., 20 input nodes).

The neural network 510 may convert the input layer 515 to a hidden layer 520 based on a number of input-to-hidden weights between the k input layer nodes 530 and the n hidden layer nodes 535. The neural network 510 may include any number of hidden layers 520 as intermediate steps between the input layer 515 and the output layer 525. Additionally, each hidden layer 520 may include any number of nodes. For example, as illustrated, the hidden layer 520 may include four hidden layer nodes 535-a, 535-b, 535-c, and 535-d. However, it is to be understood that the hidden layer 520 may include any number of hidden layer nodes 535 (e.g., 10 input nodes). In a fully connected neural network, each node in a layer may be based on each node in the previous layer. For example, the value of hidden layer node 535-a may be based on the values of input layer nodes 530-a, 530-b, and 530-c (e.g., with different weights applied to each node value).

The neural network 510 may determine values for the output layer nodes 540 of the output layer 525 following one or more hidden layers 520. For example, the neural network 510 may convert the hidden layer 520 to the output layer 525 based on a number of hidden-to-output weights between the n hidden layer nodes 535 and the m output layer nodes 540. In some cases, n=m. Each output layer node 540 may correspond to a different output value 545 of the neural network 510. For example, for the neural network 510 determining a dynamic threshold value for antenna switching, each output layer node 540 may correspond to a different threshold value for the dynamic antenna switching threshold. As such, the number of output layer nodes 540 in the output layer 525 may correspond to the level of threshold diversity supported by the UE 115. As illustrated, the neural network 510 may include three output layer nodes 540-a, 540-b, and 540-c, supporting three different threshold values. However, it is to be understood that the output layer 525 may include any number of output layer nodes 540 (e.g., 20 output nodes, corresponding to 20 potential values for the dynamic threshold). The values determined by the neural network 510 for the output layer nodes 540 may correspond to probabilities that the associated thresholds should be used by the UE 115 for antenna switching.

In one specific example, based on the input value 505 to the neural network 510, the neural network 510 may determine probability values of 0.21, 0.73, and 0.06 for output layer nodes 540-*a*, 540-*b*, and 540-*c*, respectively. Output layer node 540-*a* may correspond to a first threshold value (e.g., 4 dB), output layer node 540-*b* to a second threshold value (e.g., 7 dB), and output layer node 540-*c* to a third threshold value (e.g., 10 dB). Accordingly, based on the probability values determined for the output layer 525, the neural network 510 may determine that the second threshold value corresponding to output layer node 540-*b* (and the highest probability value, 0.73) is the most probable "optimal" threshold based on the machine learning training, where the training allows the neural network weights to bias the output towards thresholds resulting in the best performance (e.g., increasing time spent on an antenna with a highest RSRP value while reducing the number of operating antenna switches). The neural network 510 may output the second threshold value (e.g., 7 dB) as the output value 545 based on the corresponding probability value, and the UE 115 may use this second threshold value as the updated dynamic threshold value when determining whether to switch from one operating antenna to another (e.g., according to a switching algorithm).

The UE 115 may repeat this process (e.g., determining whether to perform an antenna switching test, determining an updated dynamic threshold using the neural network 510 if the antenna switching test is performed, and determining whether to switch an active antenna based on the updated threshold) each measurement cycle (e.g., every 640 ms). Additionally, in some cases, the UE 115 may re-train the neural network 510 during operation. For example, the UE 115 may store a cost function for the neural network 510. If training is activated for the neural network 510, the UE 115 may assign reward values, penalty values, or both based on metrics of the UE 115 (e.g., a number of antenna switches, a percentage or amount of time spent using an antenna with the highest RSRP, etc.) and/or based on comparing metrics of the UE 115 to simulated metrics if the UE 115 operated using a static antenna switching threshold. The cost function for the neural network 510 may be based on the reward values and/or penalty values, and the weights between nodes in the neural network 510 may be based on the cost function. Prior to any training, the m potential threshold values may be equally likely based on an input value 505, but as the neural network 510 is trained, the weights may shift such that the neural network 510 is more likely to result in certain thresholds that support efficient antenna switching at the UE 115. In some cases, the neural network 510 may be an example of a feed forward (FF) or deep feed forward (DFF) neural network, a recurrent neural network (RNN), a long/short term memory (LSTM) neural network, a convolutional neural network (CNN), or any other type of neural network.

Figure 6:
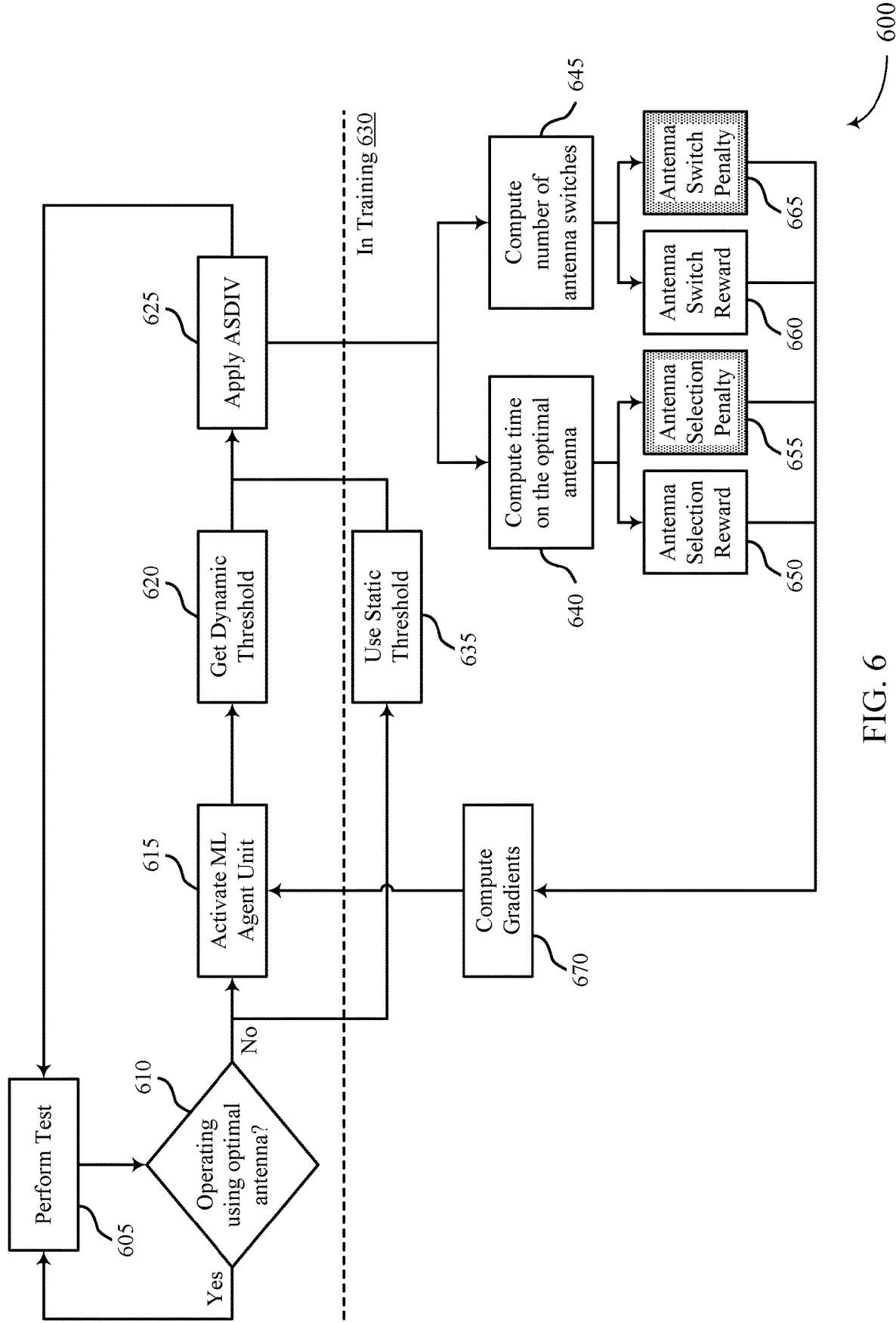
FIG. 6 illustrates an example of a decision diagram that supports dynamic thresholds for ASDIV in accordance with aspects of the present disclosure.

FIG. 6 illustrates an example of a decision diagram 600 that supports dynamic thresholds for ASDIV in accordance with aspects of the present disclosure. The decision diagram 600 illustrates a procedure for determining whether to switch an operating antenna for communications. A UE 115, as described with reference to FIGS. 1 through 3, may operate according to the decision diagram 600 using a machine learning agent unit as described with reference to FIGS. 1 through 5. The decision diagram 600 may illustrate procedures for a UE 115 to perform using a pre-trained neural network, where further training (e.g., post-deployment training) of the neural network may either currently be activated or deactivated at the UE 115.

At 605, the UE 115 may perform a test (e.g., a periodic test, an aperiodic test, etc.). If the test is a periodic test, the test may be performed based on a measurement interval. For example, the UE 115 may measure communication metrics throughout the measurement interval and may perform the periodic test at the end of each measurement interval (e.g., every 640 ms). In some cases, the length of the measurement interval is pre-configured at the UE 115. In other cases, the length of the measurement interval may vary (e.g., based on channel conditions, an environment that the UE 115 operates within, etc.). If the test is an aperiodic test, the test may be performed based on a schedule or based on one or more triggers.

The test may involve, at 610, the UE 115 determining whether the UE 115 operated on the "optimal" antenna during the preceding measurement interval. For example, the UE 115 may measure RSRP values for a set of antennas during the measurement interval and may determine an "optimal" antenna based on the RSRP measurements. In a first example, the UE 115 may average the RSRP values for each antenna over the preceding measurement interval and may identify the antenna with the greatest average RSRP value as the "optimal" antenna. In a second example, the UE 115 may identify the antenna of the set of antennas with the highest RSRP value for the greatest amount of time during the preceding measurement interval as the "optimal" antenna. In a third example, the UE 115 may calculate RSRPΔ values for the set of antennas throughout the measurement interval and may identify the antenna with the greatest average RSRPΔ value as the "optimal" antenna. If the UE 115 operated on the identified "optimal" antenna for the preceding measurement interval, the UE 115 may not perform an antenna switching test (e.g., including updating a dynamic threshold and determining whether to switch the operating antenna based on the dynamic threshold). Instead, the UE 115 may perform the test again at 605 (e.g., following another measurement interval). Alternatively, if the UE 115 did not operate on the identified "optimal" antenna for the preceding measurement interval, the UE 115 may activate a machine learning agent unit at 615.

Activating the machine learning agent unit at 615 may involve updating a dynamic threshold for antenna switching. The UE 115 may input one or more RSRPΔ values between antennas (e.g., an average RSRPΔ value for the preceding measurement interval, multiple RSRPΔ values measured during the preceding measurement interval, etc.) to the machine learning agent unit. In a first example, the machine learning agent unit may use a trained neural network to determine an updated dynamic threshold for antenna switching based on the input RSRPΔ value(s). Additionally or alternatively, the machine learning agent unit may use a heuristic to determine the updated dynamic threshold based on the input. Based on the results of the machine learning agent unit, the UE 115 may get the updated dynamic threshold value at 620 and may use the updated dynamic threshold value to apply an ASDIV feature at 625. The ASDIV feature may determine whether to switch the operating antenna based on comparing the measurements from the preceding measurement interval to the updated dynamic threshold value. For example, if the average RSRPΔ value between a second antenna and the current operating antenna for the preceding measurement interval is greater than or equal to the updated dynamic threshold value, the UE 115 may switch from the current operating antenna to the second antenna for communicating during a next measurement interval. The UE 115 may repeat this process according to the testing periodicity (e.g., based on the length of the measurement interval) or according to some other schedule-based and/or trigger-based criteria.

In some cases, the UE 115 may implement training for the machine learning agent unit (e.g., in a smart agent model). Training 630 for the machine learning agent unit may be activated independent of activating the machine learning agent unit (e.g., where activating the machine learning agent unit involves updating the dynamic threshold for antenna switching as described herein). Specifically, the UE 115 may activate the machine learning agent unit based on current communication measurements in order to use a trained neural network to update the dynamic threshold for antenna switching, while the UE 115 may activate training 630 for the machine learning agent unit based on a schedule for training, a performance of the dynamic threshold for antenna switching, or both in order to update the neural network itself.

When in training 630, the UE 115 may perform a number of additional processes to the ones described above. In some cases, the UE 115 may activate or reactivate training if the percentage of time that the UE 115 operates on the "optimal" antenna degrades below a threshold percentage for some training time period, which may be the same or different from (e.g., longer than) a measurement interval used to perform the test at 605. For example, the UE 115 may reactivate training if the UE 115 operates on the "optimal" antenna less than 60% of the time over a span of multiple measurement intervals (e.g., 20 measurement intervals). The UE 115 may deactivate training if the percentage of time that the UE 115 operates on the "optimal" antenna exceeds a threshold percentage (e.g., the same threshold percentage or a different threshold percentage). Additionally or alternatively, the UE 115 may turn training off to conserve computational power, computational resources, and/or memory usage. For example, the UE 115 may determine whether the UE 115 has sufficient resources for machine learning training based on available central processing unit (CPU) resources, available DSP power, or a combination thereof. The UE 115 may dynamically activate or deactivate training based on the CPU and/or DSP resources, power utilization, or both. Additionally or alternatively, the UE 115 may dynamically activate or deactivate training based on a training schedule of the UE 115. For example, the UE 115 may track communication measurements throughout the day and may turn on training once a day at midnight to process the tracked communication measurements and update the machine learning agent unit based on the processing.

When in training 630, the UE 115 may track communication measurements and/or metrics according to a static antenna switching threshold (e.g., in addition to the tracked measurements and/or metrics for the dynamic antenna switching threshold). The UE 115 may use the static threshold in parallel to the dynamic threshold at 635, such that the UE 115 may determine whether the ASDIV feature would switch operating antennas or stay on an operating antenna based on the static threshold. The UE 115 (e.g., a training module of the UE 115) may apply rewards and/or penalties based on comparing metrics for the dynamic antenna switching threshold with metrics for the static antenna switching threshold.

For example, at 640, the UE 115 may compute a percentage of time operating using the "optimal" antenna based on the dynamic threshold for a training measurement cycle (e.g., a training time period, such as a day). Additionally, the UE 115 may compute a percentage of time that the UE 115 would operate using the "optimal" antenna if operating based on the static threshold (e.g., for the same training time period, such as a day). The UE 115 may compare the percentages of time operating using the "optimal" antenna for the dynamic threshold and for the static threshold and may determine an antenna selection reward or an antenna selection penalty based on the comparison. For example, the UE 115 may determine an antenna selection reward at 650 if the UE 115 operated using the "optimal" antenna a greater percentage of time based on the dynamic threshold than the static threshold and may determine an antenna selection penalty at 655 if the UE 115 would operate using the "optimal" antenna a greater percentage of time based on the static threshold than the dynamic threshold. The antenna selection reward or the antenna selection penalty may be applied to a cost function for a neural network of the machine learning agent unit.

Similarly, at 645, the UE 115 may compute a number of active antenna switches performed based on the dynamic threshold and a number of active antenna switches that the UE 115 would perform if operating based on the static threshold. The UE 115 may compare the numbers of antenna switches for the dynamic threshold and the static threshold and may determine an antenna switch reward or an antenna switch penalty based on the comparison. For example, the UE 115 may determine an antenna switch reward at 660 if the UE 115 performed a fewer number of switches based on the dynamic threshold than the static threshold and may determine an antenna switch penalty at 665 if the UE 115 would perform a fewer number of switches based on the static threshold than the dynamic threshold. The antenna switch reward or the antenna switch penalty may be applied to the cost function for the neural network of the machine learning agent unit (e.g., alternative or in addition to the antenna selection reward or the antenna selection penalty). The penalties and rewards may be calculated for a given time period (e.g., for a second, a minute, an hour, a day, etc.) or for a given set of communications (e.g., for a specific call).

At 670, the UE 115 may compute gradients based on the penalties and/or rewards and may update the machine learning agent unit (e.g., a neural network of the machine learning agent unit) based on the computed gradients. In one example, the machine learning agent unit may update one or more weights between nodes of a neural network based on the computed gradients. This training may provide reinforced learning for the machine learning agent unit and may continue to tune and/or improve the neural network based on operations of the UE 115.

Figure 7:
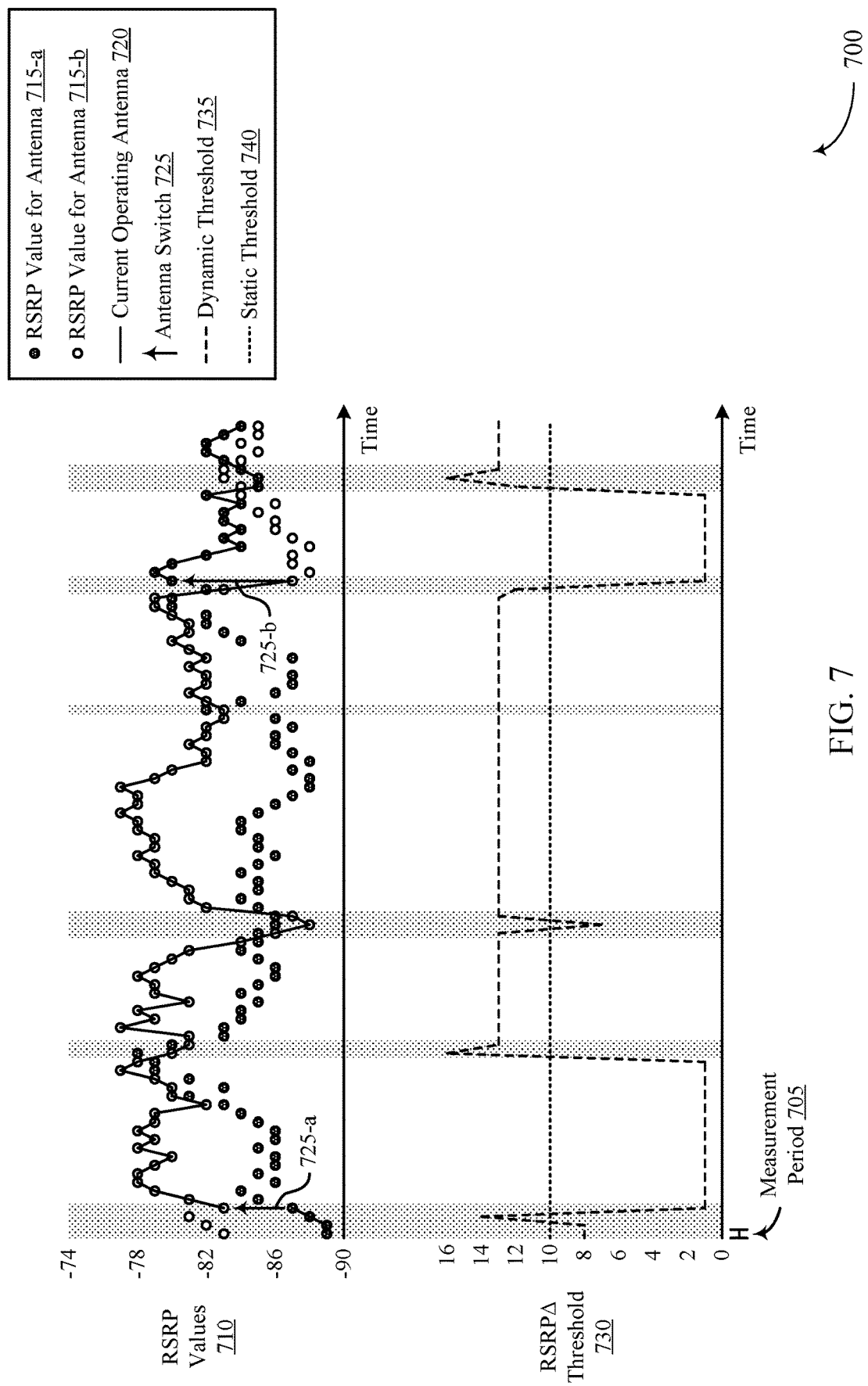
FIG. 7 illustrates an example of an antenna switching procedure that supports dynamic thresholds for ASDIV in accordance with aspects of the present disclosure.

FIG. 7 illustrates an example of an antenna switching procedure 700 that supports dynamic thresholds for ASDIV in accordance with aspects of the present disclosure. The antenna switching procedure 700 may be performed by a UE 115 as described with reference to FIGS. 1 through 6 implementing a dynamic threshold 735 for antenna switching. In some cases, the dynamic threshold 735 may be based on a machine learning agent unit containing a trained neural network. As illustrated, the neural network may output an RSRPΔ threshold 730 from a set of possible thresholds (e.g., from 1 dB to 16 dB), and the UE 115 may determine whether to switch from operating using a first antenna to operating using a second antenna based on the RSRPΔ threshold 730. The antenna switching procedure 700 may illustrate one potential example of measurements for a call performed by a UE 115.

The UE 115 may include two antennas and may track RSRP values 710 for each antenna. For example, the UE 115 may measure an RSRP value for the first antenna 715-a and may measure an RSRP value for the second antenna 715-b.

The RSRP values may correspond to average RSRP values for measurement periods 705. The UE 115 may activate the machine learning agent unit if the current operating antenna 720 (e.g., either the first antenna 715-a or the second antenna 715-b) has a lower RSRP value than the other antenna during a measurement period 705. While the machine learning agent unit is active, the UE 115 may update the dynamic threshold 735 and may compare the RSRPΔ between the two antennas to the current value of the dynamic RSRPΔ threshold 730. If the current RSRPΔ between the two antennas is greater than or equal to the current value of the dynamic RSRPΔ threshold 730, the UE 115 may perform an antenna switch 725.

For example, the UE 115 may initially operate using antenna 715-a. However, based on the dynamic threshold 735, the UE 115 may perform an antenna switch 725-a from antenna 715-a to antenna 715-b. That is, the UE 115 may activate the machine learning agent unit and determine an updated dynamic threshold value using the activated machine learning agent unit. For example, inputting the current communication measurements (e.g., the current RSRP value for the first antenna 715-a, the current RSRP value for the second antenna 715-b, a difference in the current RSRP values for the antennas, a number of consecutive measurement periods 705 in which the current operating antenna 720 is not the "optimal" antenna, or some combination of these and/or other communication parameters) into a neural network of the activated machine learning agent unit may determine an updated value for the dynamic threshold 735. As illustrated, based on the current communication measurements, the UE 115 may update the dynamic threshold 735 from 8 dB, to 14 dB, to 1 dB. The UE 115 may perform the antenna switch 725-a based on the RSRPΔ value between the current operating antenna 720 and the other antenna (e.g., approximately 4 dB) being greater than the dynamic threshold 735 when the dynamic threshold 735 is switched from 14 dB to 1 dB. In some cases, this drop from 14 dB to 1 dB may be based on the current operating antenna 720 being "non-optimal" (e.g., having a lower RSRP value 710 than another antenna) for a number of consecutive measurement periods 705 without an antenna switch 725.

The UE 115 may operate on antenna 715-b until antenna switch 725-b. As illustrated, the RSRP value for antenna 715-b (e.g., the current operating antenna 720) may drop below the RSRP value for antenna 715-a a number of times before the antenna switch 725-b, causing the machine learning agent unit to activate and the dynamic threshold 735 to update. For example, in one case, the dynamic threshold 735 may increase from 1 dB to 16 dB based on an output of the neural network of the activated machine learning agent unit (e.g., based on the current operating antenna 720 being "non-optimal" for a first measurement period 705 since the antenna switch 725-a, or based on any other current communication measurements or parameters). However, based on the RSRP values 710 and the dynamic RSRPΔ threshold 730, the UE 115 may stay on antenna 715-b. This may reduce the number of antenna switches and result in efficient ASDIV operations.

In some cases, a static threshold 740 (e.g., 10 dB) may be stored at the UE 115 and the UE 115 may track predicted operations based on the static threshold 740. The UE 115 may use these predicted operations when implementing training for the neural network of the machine learning agent unit. For example, the UE 115 may compare the performance of these predicted operations with the performance of the actual operations (e.g., using the dynamic threshold 735) for a given training time period and may activate training of the machine learning agent unit based on the comparison. For example, if the performance of the dynamic threshold 735 degrades below the performance of the static threshold 740, the UE 115 may perform a machine learning process to update the weights between nodes of the neural network for the machine learning agent unit. The updated neural network may result in different dynamic threshold 735 values than the non-updated neural network when the machine learning agent unit is activated. In one specific example, if prior to this updated training the neural network results in a dynamic threshold 735 value of 10 dB based on a certain set of current communication measurements, after training the neural network with the updated weights may result in a dynamic threshold 735 value of 12 dB based on the same set of current communication measurements.

Figure 8:
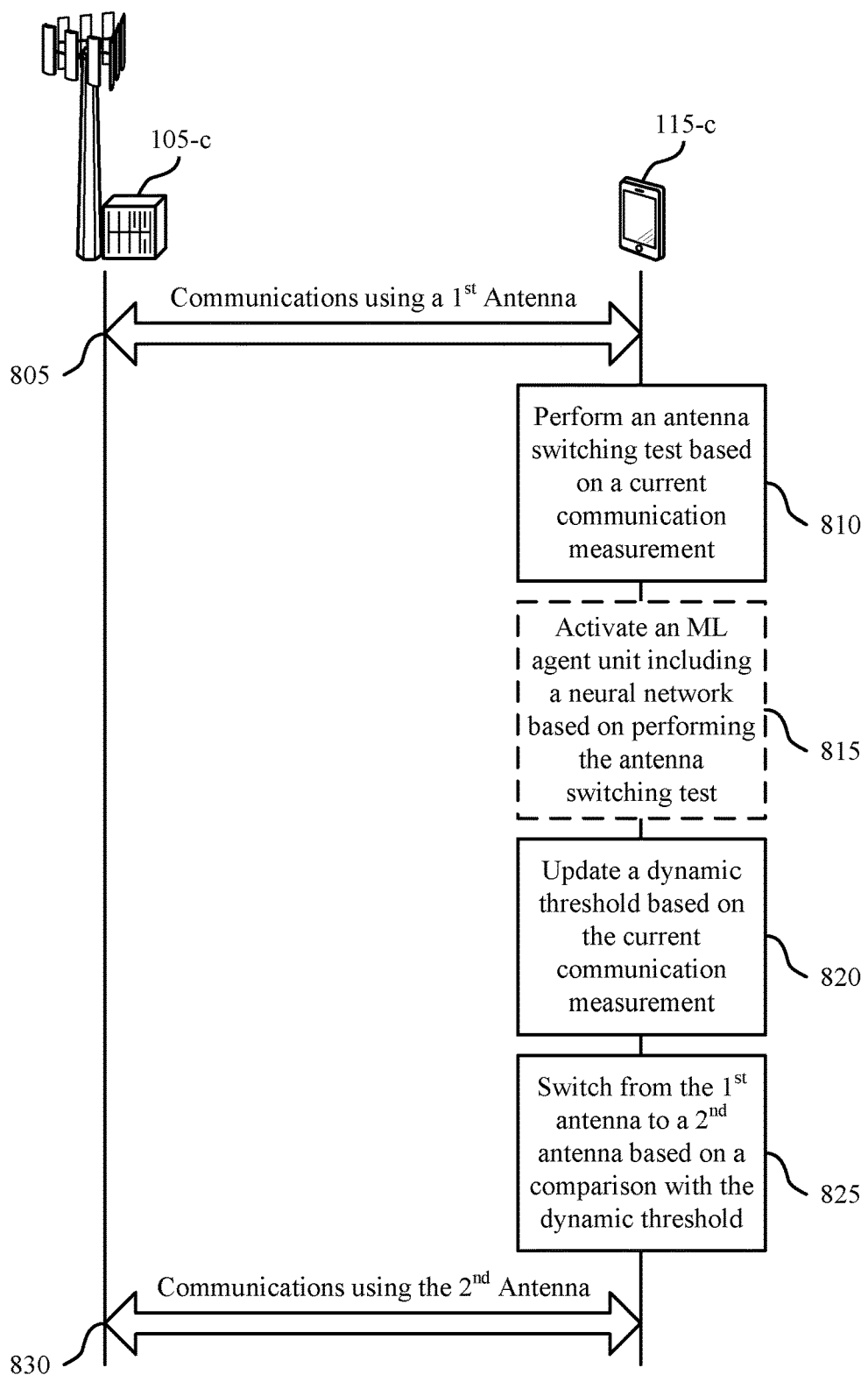
FIG. 8 illustrates an example of a process flow that supports dynamic thresholds for ASDIV in accordance with aspects of the present disclosure.

FIG. 8 illustrates an example of a process flow 800 that supports dynamic thresholds for ASDIV in accordance with aspects of the present disclosure. The process flow 800 may illustrate an example antenna switching procedure at UE 115-c. UE 115-c may communicate with base station 105-c or another wireless device. UE 115-c and base station 105-c may be examples of the corresponding wireless devices described with reference to FIGS. 1 through 7. In some cases, instead of UE 115-c implementing the antenna switching procedure, a different type of wireless device (e.g., a base station 105) may implement ASDIV. Alternative examples of the following may be implemented, where some steps are performed in a different order than described or are not performed at all. In some cases, steps may include additional features not mentioned below, or further steps may be added.

At 805, UE 115-c may communicate with a wireless device (e.g., base station 105-c) using a first antenna of a set of antennas. At 810, UE 115-c may perform an antenna switching test on the set of antennas based on a current communication measurement. In some cases, the current communication measurement—which may be referred to as the "first" current communication measurement for the first antenna (i.e., the active antenna)—may be an example of a first RSRP measurement for the first antenna. UE 115-c may measure an RSRP for each antenna of the set of antennas and may perform the antenna switching test if the first RSRP for the first antenna is the highest RSRP value for the set of antennas for less than a threshold percentage of time (e.g., 50%) of a measurement cycle. In some other cases, the current communication measurement may be an example of a transmit power measurement for the first antenna (e.g., where a feedback receiver may determine the transmit power for the first antenna). UE 115-c may perform the antenna switching test if the transmit power for the first antenna is greater than a transmit power threshold (e.g., 23 dB).

At 815, UE 115-c may activate a machine learning agent unit including a neural network based on performing the antenna switching test. The neural network may be a universal neural network or may be specific to a chipset, a type of UE, the UE 115-c, a user of the UE 115-c, or some combination of these. At 820, UE 115-c may update a dynamic threshold from a first threshold value to a second threshold value (e.g., different from the first threshold value) based on the current communication measurement. In some cases, the dynamic threshold may be updated based on the neural network. For example, UE 115-c may input a set of differences in RSRPs between antennas of the set of antennas into the neural network, receive a set of threshold values for the dynamic threshold as output of the neural network, and select the second threshold value from the set of threshold values based on a probability value associated with the second threshold value.

In some cases, UE 115-c may activate training for the machine learning agent unit at the UE 115-c. The machine learning agent unit training may be activated based on an antenna switching metric, a UE training schedule, or a combination thereof. The training may involve updating one or more weights between nodes of the neural network based on a number of antenna switches, an amount of time operating using an antenna with a highest RSRP (or a lowest transmit power for a given SINR) of the set of antennas, or both. In some examples, to support training, UE 115-c may track antenna switching decision-making according to a static threshold (e.g., while operating based on antenna switching decision-making according to the dynamic threshold). Updating the neural network weights may involve comparing the number of antenna switches using the dynamic threshold to a number of antenna switches using a static threshold and applying a reward value or a cost value to a cost function for the neural network based on the comparing. Additionally or alternatively, updating the neural network weights may involve comparing the amount of time operating using the antenna with the highest RSRP of the set of antennas using the dynamic threshold to an amount of time operating the antenna with the highest RSRP of the set of antennas using the static threshold and may apply a reward value or cost value to the cost function for the neural network based on the comparing. In some cases, UE 115-c may deactivate training for the machine learning agent unit at UE 115-c (e.g., based on an antenna switching metric, a UE training schedule, or both).

At 825, UE 115-c may switch from the first antenna to a second antenna of the set of antennas based on a comparison between the updated dynamic threshold and a comparison value that is based on the current communication measurement. In some cases, the comparison value may be determined by measuring a first current communication measurement (e.g., a first RSRP value) for the first antenna and a second current communication measurement (e.g., a second RSRP value) for the second antenna and calculating a difference between the second current communication measurement and the first current communication measurement (e.g., an RSRPΔ value). Here, "first" and "second" may not denote a temporal association, but instead indicate for which antenna (i.e., the first antenna or the second antenna) the measurement is performed. UE 115-c may switch the operating antenna if UE 115-c determines that the calculated difference (e.g., the RSRPΔ value) is greater than or equal to the dynamic threshold.

At 830, UE 115-c may communicate with the wireless device (e.g., base station 105-c) using the second antenna based on the antenna switch. In some cases, the antenna switch may reduce a transmit power for transmission used by UE 115-c. UE 115-c may switch the operating antenna for transmitting uplink signals based on communication measurements of downlink signals.

In some systems, UE 115-c may perform the process described herein periodically according to a measurement cycle. For example, UE 115-c may periodically measure the current communication measurement for a measurement cycle, where the current communication measurement corresponds to the average RSRP or the average transmit power of the operating antenna for the measurement cycle. UE 115-c may periodically determine whether to perform the antenna switching test according to the measurement cycle and based on the periodic measuring of the current communication measurement. The length of the measurement cycle may be static (e.g., 640 ms) or dynamic (e.g., based on the channel quality, a speed of the UE 115-c, changes in the system, etc.).

Furthermore, in some systems, UE 115-c may implement the process described herein to support multi-antenna switching. For example, UE 115-c may operate using a first set of antennas and may switch to operating using a second set of antennas based on one or more dynamic thresholds. The first set and second set of antennas may be distinct or may include one or more same antennas. For example, UE 115-c may switch one antenna of a set of active antennas based on a dynamic threshold, or UE 115-c may switch multiple antennas of the set of active antennas based on the dynamic threshold (or based on multiple dynamic thresholds).

Figure 9:
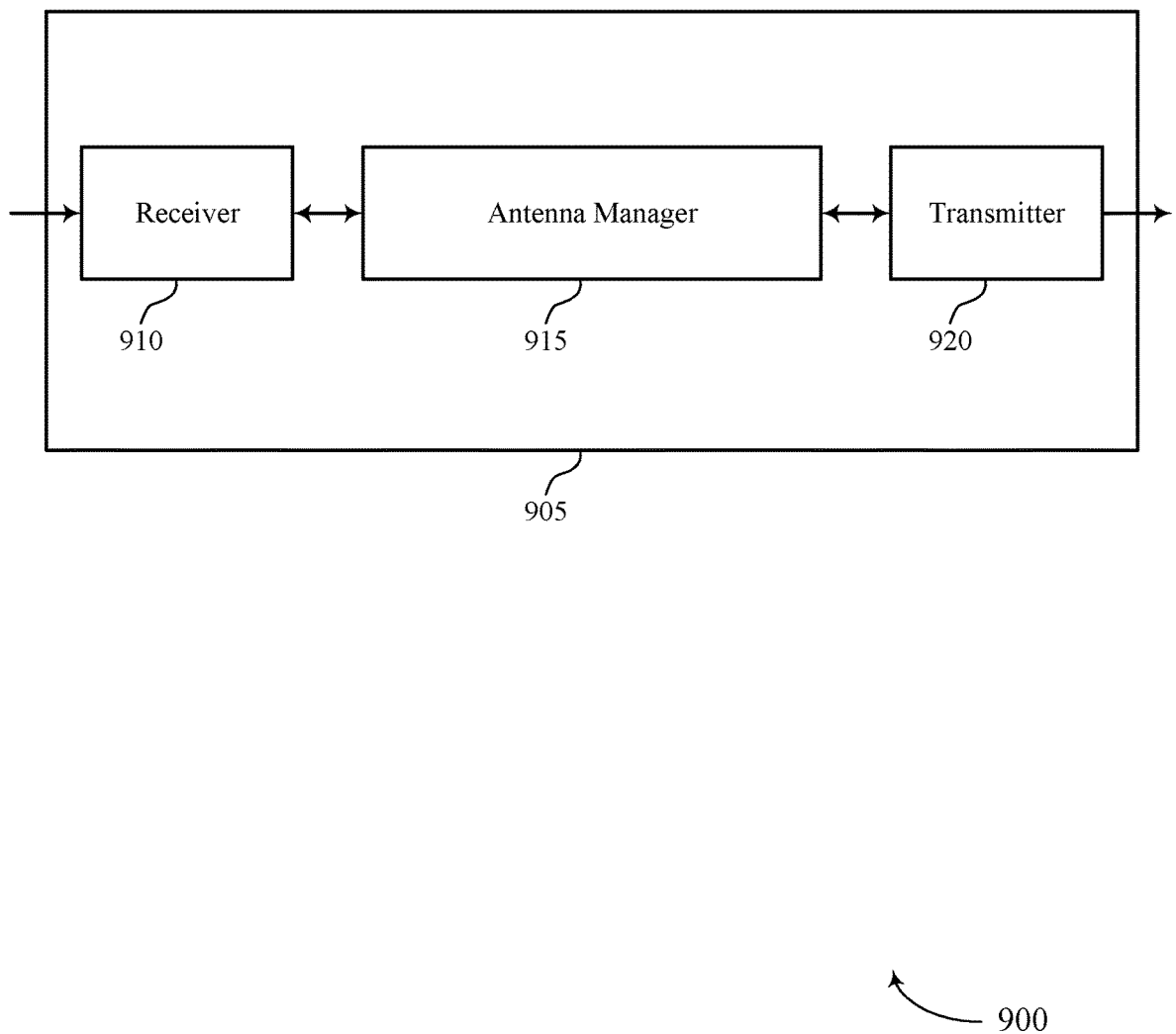
FIGS. 9 and 10 show block diagrams of devices that support dynamic thresholds for ASDIV in accordance with aspects of the present disclosure.

FIG. 9 shows a block diagram 900 of a device 905 that supports dynamic thresholds for ASDIV in accordance with aspects of the present disclosure. The device 905 may be an example of aspects of a UE 115 as described herein. The device 905 may include a receiver 910, an antenna manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic thresholds for ASDIV using a machine learning agent unit, etc.). Information may be passed on to other components of the device 905. The receiver 910 may be an example of aspects of the transceiver 1220 described with reference to FIG. 12. The receiver 910 may utilize a single antenna or a set of antennas.

In one embodiment, the antenna manager 915 may communicate with a wireless device using a first antenna of a set of antennas, update a dynamic threshold from a first threshold value to a second threshold value different from the first threshold value based on a current communication measurement, switch from the first antenna to a second antenna of the set of antennas based on a comparison between the updated dynamic threshold and a comparison value that is based on the current communication measurement, and communicate with the wireless device using the second antenna based on the switch.

This embodiment may support reduced power consumption at the UE 115, as the dynamic threshold may reduce the number of antenna switches performed by the UE 115. Additionally, the embodiment may improve transmission reliability, as the dynamic threshold may improve a percentage of time that the UE 115 operates using an optimal antenna (e.g., an antenna with a highest current RSRP) of the set of antennas. Moreover, the reduction in antenna switches may allow the UE 115 to mitigate the loss of antenna throughput associated with each antenna switch.

Furthermore, based on switching antennas of the set of antennas according to a dynamic threshold, a processor of the UE 115 (e.g., controlling the receiver 910, the antenna manager 915, the transmitter 920, and/or the transceiver 1220 described with reference to FIG. 12) may reduce the processing resources needed to handle ASDIV, as the processor may signal for antenna switches less frequently. Additionally, based on the improved throughput of the active antenna, a number of re-transmissions may be reduced for the UE 115. Accordingly, the processor may reduce processing resources used to prepare transport blocks (TBs) for re-transmission. The reduction in re-transmissions may also lower the signaling overhead in the system.

The antenna manager 915 may be an example of aspects of the antenna manager 1210 described herein. The antenna manager 915, or its sub-components, may be implemented in hardware, code (e.g., software or firmware) executed by a processor, or any combination thereof. If implemented in code executed by a processor, the functions of the antenna manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The antenna manager 915, or its sub-components, may be physically located at various positions, including being distributed such that portions of functions are implemented at different physical locations by one or more physical components. In some examples, the antenna manager 915, or its sub-components, may be a separate and distinct component in accordance with various aspects of the present disclosure. In some examples, the antenna manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
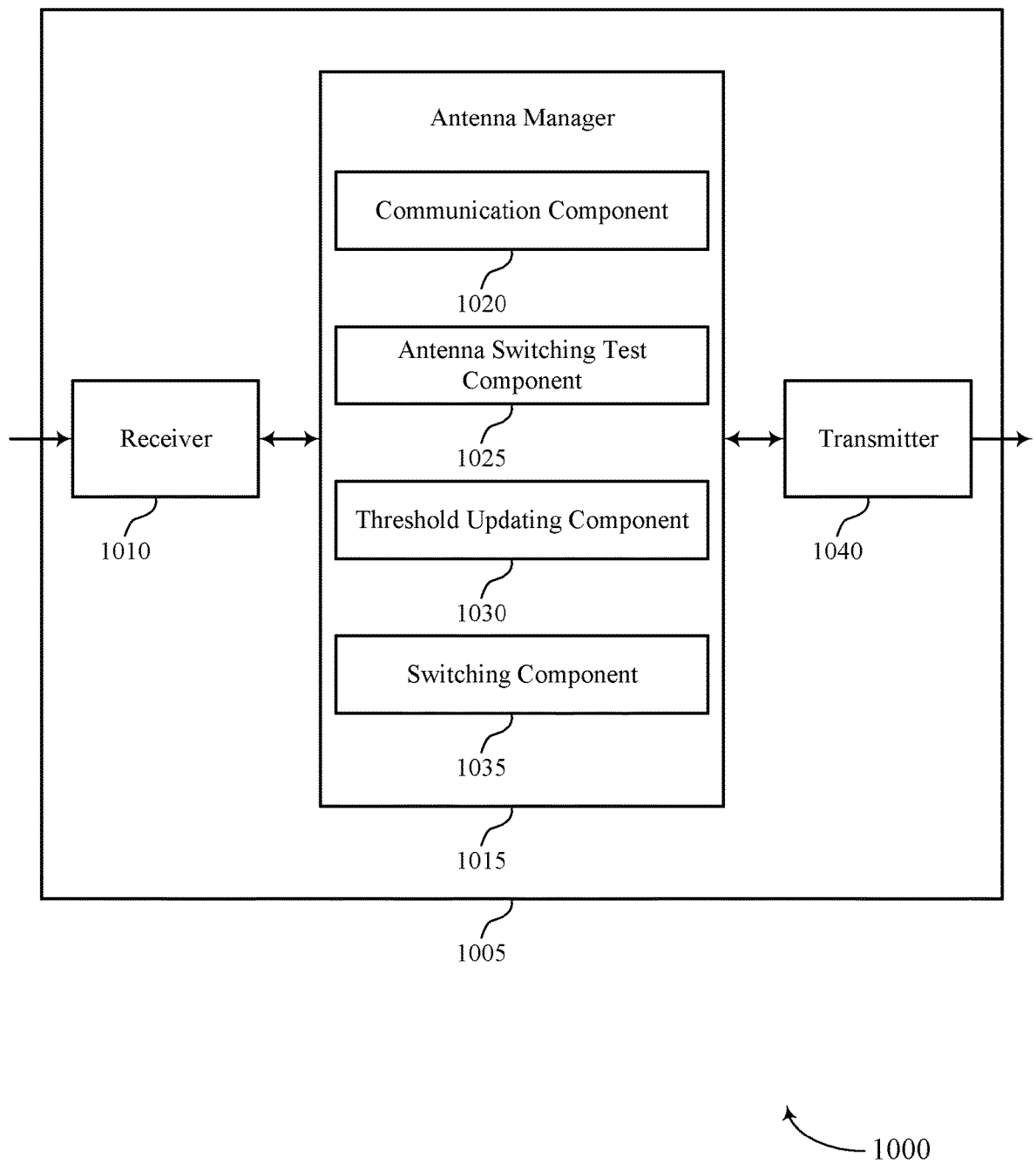

FIG. 10 shows a block diagram 1000 of a device 1005 that supports dynamic thresholds for ASDIV in accordance with aspects of the present disclosure. The device 1005 may be an example of aspects of a device 905 or a UE 115 as described herein. The device 1005 may include a receiver 1010, an antenna manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic thresholds for ASDIV using a machine learning agent unit, etc.). Information may be passed on to other components of the device 1005. The receiver 1010 may be an example of aspects of the transceiver 1220 described with reference to FIG. 12. The receiver 1010 may utilize a single antenna or a set of antennas.

The antenna manager 1015 may be an example of aspects of the antenna manager 915 as described herein. The antenna manager 1015 may include a communication component 1020, an antenna switching test component 1025, a threshold updating component 1030, and a switching component 1035. The antenna manager 1015 may be an example of aspects of the antenna manager 1210 described herein.

The communication component 1020 may communicate with a wireless device using a first antenna of a set of antennas. In some cases, the communication component 1020 may be a component of or in communication with the receiver 1010, the transmitter 1040, or some combination of these. The antenna switching test component 1025 may determine to perform an antenna switching test on the set of antennas based on a current communication measurement. The threshold updating component 1030 may update a dynamic threshold from a first threshold value to a second threshold value different from the first threshold value based on the current communication measurement. The switching component 1035 may switch from the first antenna to a second antenna of the set of antennas based on a comparison between the updated dynamic threshold and a comparison value that is based on the current communication measurement. The communication component 1020 may communicate with the wireless device using the second antenna based on the switch.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
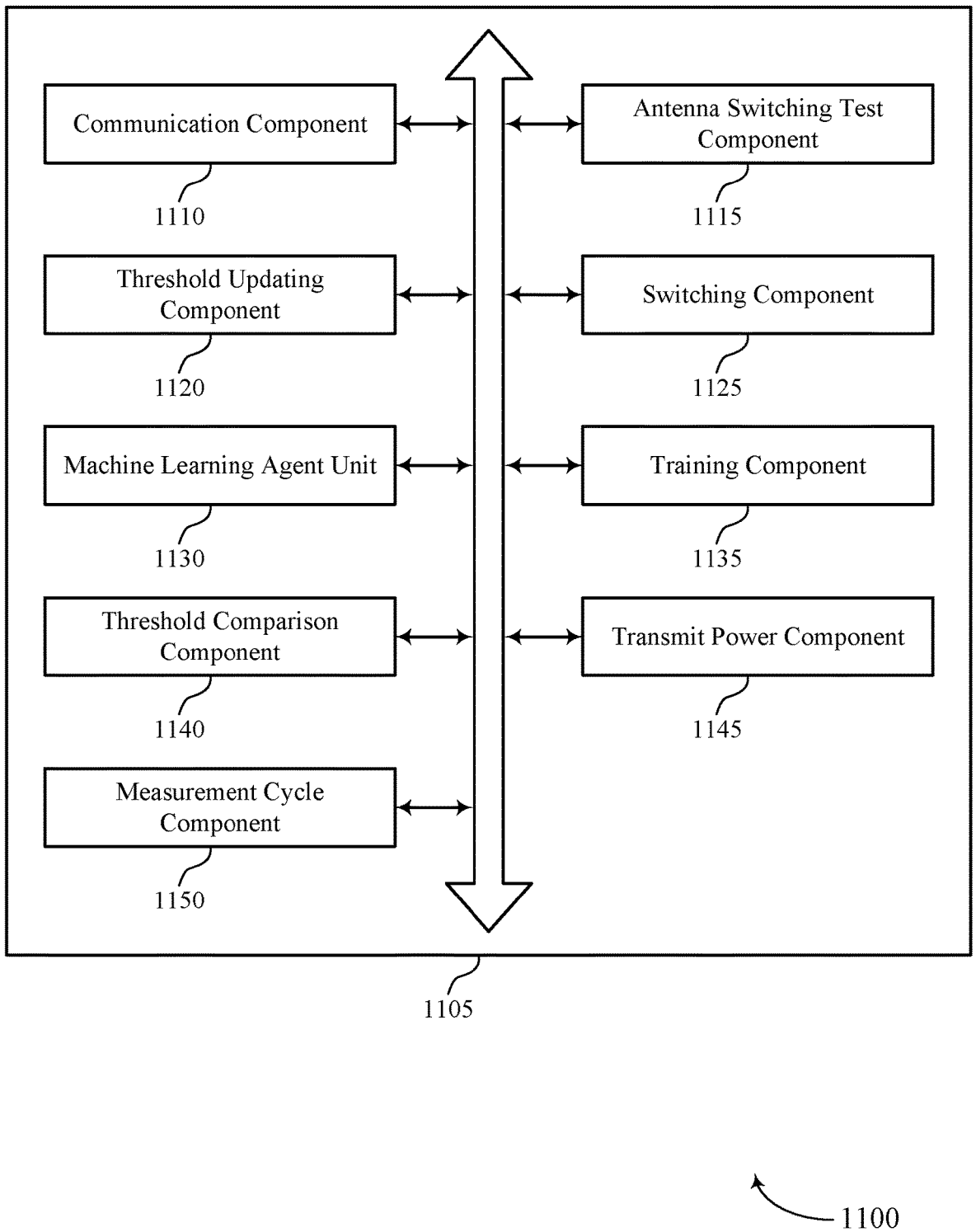
FIG. 11 shows a block diagram of an antenna manager that supports dynamic thresholds for ASDIV in accordance with aspects of the present disclosure.

FIG. 11 shows a block diagram 1100 of an antenna manager 1105 that supports dynamic thresholds for ASDIV in accordance with aspects of the present disclosure. The antenna manager 1105 may be an example of aspects of an antenna manager 915, an antenna manager 1015, or an antenna manager 1210 described herein. The antenna manager 1105 may include a communication component 1110, an antenna switching test component 1115, a threshold updating component 1120, a switching component 1125, a machine learning agent unit 1130, a training component 1135, a threshold comparison component 1140, a transmit power component 1145, a measurement cycle component 1150, or any combination of these or other similar components. Each of these modules may communicate, directly or indirectly, with one another (e.g., via one or more buses). In some cases, the antenna manager 1105 may be a component of a UE 115.

The communication component 1110 may communicate with a wireless device using a first antenna of a set of antennas. The antenna switching test component 1115 may determine to perform an antenna switching test on the set of antennas based on a current communication measurement.

In some cases, the current communication measurement may be an example of a first RSRP for the first antenna. In some of these cases, performing the antenna switching test may involve the antenna switching test component 1115 measuring an RSRP for each antenna of the set of antennas and identifying that the first RSRP for the first antenna is a highest RSRP for the set of antennas for less than a threshold percentage of time for a measurement cycle, where a dynamic threshold is updated based on the identifying. In some other cases, the current communication measurement may be an example of a transmit power for the first antenna. In some of these other cases, performing the antenna switching test may involve the antenna switching test component 1115 identifying that the transmit power for the first antenna is greater than a transmit power threshold, where the dynamic threshold is updated based on the identifying.

In some cases, the current communication measurement is an example of one or both of an average RSRP of the first antenna for a measurement cycle and an average transmit power of the first antenna for the measurement cycle. In some of these cases, the measurement cycle component 1150 may periodically measure the current communication measurement according to the measurement cycle and may periodically determine whether to update the dynamic threshold according to the measurement cycle and based on the periodic measuring.

The threshold updating component 1120 may update a dynamic threshold from a first threshold value to a second threshold value different from the first threshold value based on a current communication measurement (e.g., the current communication measurement or "first" current communication measurement described above). The switching component 1125 may switch from the first antenna to a second antenna of the set of antennas based on a comparison between the updated dynamic threshold and a comparison value that is based on the current communication measurement.

The communication component 1110 may communicate with the wireless device using the second antenna based on the switch. In some examples, the current communication measurement is an example of a measurement of a downlink signal or a measurement of transmitted power using a feedback receiver, and communicating with the wireless device involves the communication component 1110 transmitting an uplink signal to the wireless device (e.g., using the second antenna based on the switch). Additionally or alternatively, the transmit power component 1145 may reduce a transmit power for transmission based on the switch.

In some cases, updating the dynamic threshold may be based on a neural network. In some examples, using the neural network may involve the machine learning agent unit 1130 inputting a set of differences in RSRPs between antennas of the set of antennas into the neural network; receiving, as output of the neural network, a set of threshold values for the dynamic threshold; and selecting the second threshold value from the set of threshold values based on a probability value associated with the second threshold value. In some examples, the machine learning agent unit 1130 may determine the neural network specific to one or more of a chipset, a type of UE, a UE, and a user operating a UE.

The training component 1135 may activate training for a machine learning agent unit 1130 including the neural network at the UE 115. In some examples, the training component 1135 may update one or more weights between nodes of the neural network based on one or both of a number of antenna switches and an amount of time operating using an antenna with a highest RSRP of the set of antennas, where the dynamic threshold is updated based on the one or more updated weights between the nodes of the neural network.

In some examples, updating the one or more weights between nodes of the neural network involves the training component 1135 comparing the number of antenna switches using the dynamic threshold to a number of antenna switches using a static threshold and applying a reward value or a cost value to a cost function for the neural network based on the comparing, where updating the one or more weights between the nodes of the neural network is based on the cost function. Additionally or alternatively, updating the one or more weights between nodes of the neural network may involve the training component 1135 comparing the amount of time operating using the antenna with the highest RSRP of the set of antennas using the dynamic threshold to an amount of time operating the antenna with the highest RSRP of the set of antennas using a static threshold and applying a reward value or a cost value to a cost function for the neural network based on the comparing, where updating the one or more weights between the nodes of the neural network is based on the cost function.

In some cases, the training for the machine learning agent unit 1130 is activated at the UE based on one or both of the number of antenna switches and the amount of time operating using the antenna with the highest RSRP of the set of antennas. In some other cases, the training for the machine learning agent unit 1130 is activated at the UE based on a UE training schedule. In some examples, the training component 1135 may deactivate the training for the machine learning agent unit 1130 at the UE 115.

In some cases, the current communication measurement may be an example of a first current communication measurement for the first antenna. The threshold comparison component 1140 may determine a second current communication measurement for the second antenna and may calculate a difference between the second current communication measurement and the first current communication measurement, where the comparison value corresponds to the calculated difference. In some examples, the threshold comparison component 1140 may determine that the calculated difference is greater than or equal to the dynamic threshold, where the switching from the first antenna to the second antenna is based on the determining that the calculated difference is greater than or equal to the dynamic threshold.

Figure 12:
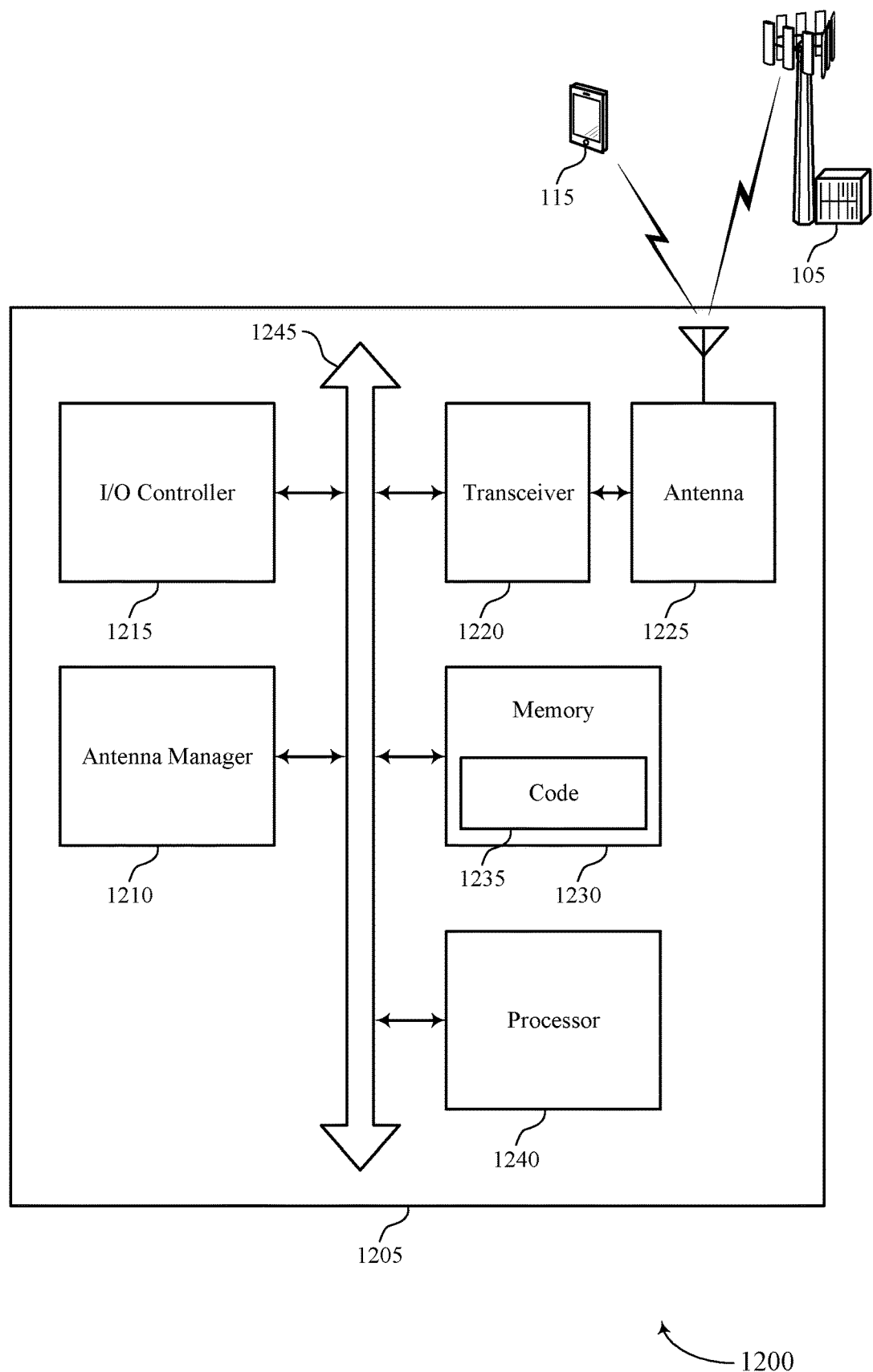
FIG. 12 shows a diagram of a system including a device that supports dynamic thresholds for ASDIV in accordance with aspects of the present disclosure.

FIG. 12 shows a diagram of a system 1200 including a device 1205 that supports dynamic thresholds for ASDIV in accordance with aspects of the present disclosure. The device 1205 may be an example of or include the components of device 905, device 1005, or a UE 115 as described herein. The device 1205 may include components for bi-directional voice and data communications including components for transmitting and receiving communications, including an antenna manager 1210, an I/O controller 1215, a transceiver 1220, an antenna 1225, memory 1230, and a processor 1240. These components may be in electronic communication via one or more buses (e.g., bus 1245).

The antenna manager 1210 may communicate with a wireless device using a first antenna of a set of antennas, perform an antenna switching test on the set of antennas based on a current communication measurement, update a dynamic threshold from a first threshold value to a second threshold value different from the first threshold value based on the current communication measurement, switch from the first antenna to a second antenna of the set of antennas based on a comparison between the updated dynamic threshold and a comparison value that is based on the current communication measurement, and communicate with the wireless device using the second antenna based on the switch.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic thresholds for antenna switching diversity using a machine learning agent unit).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
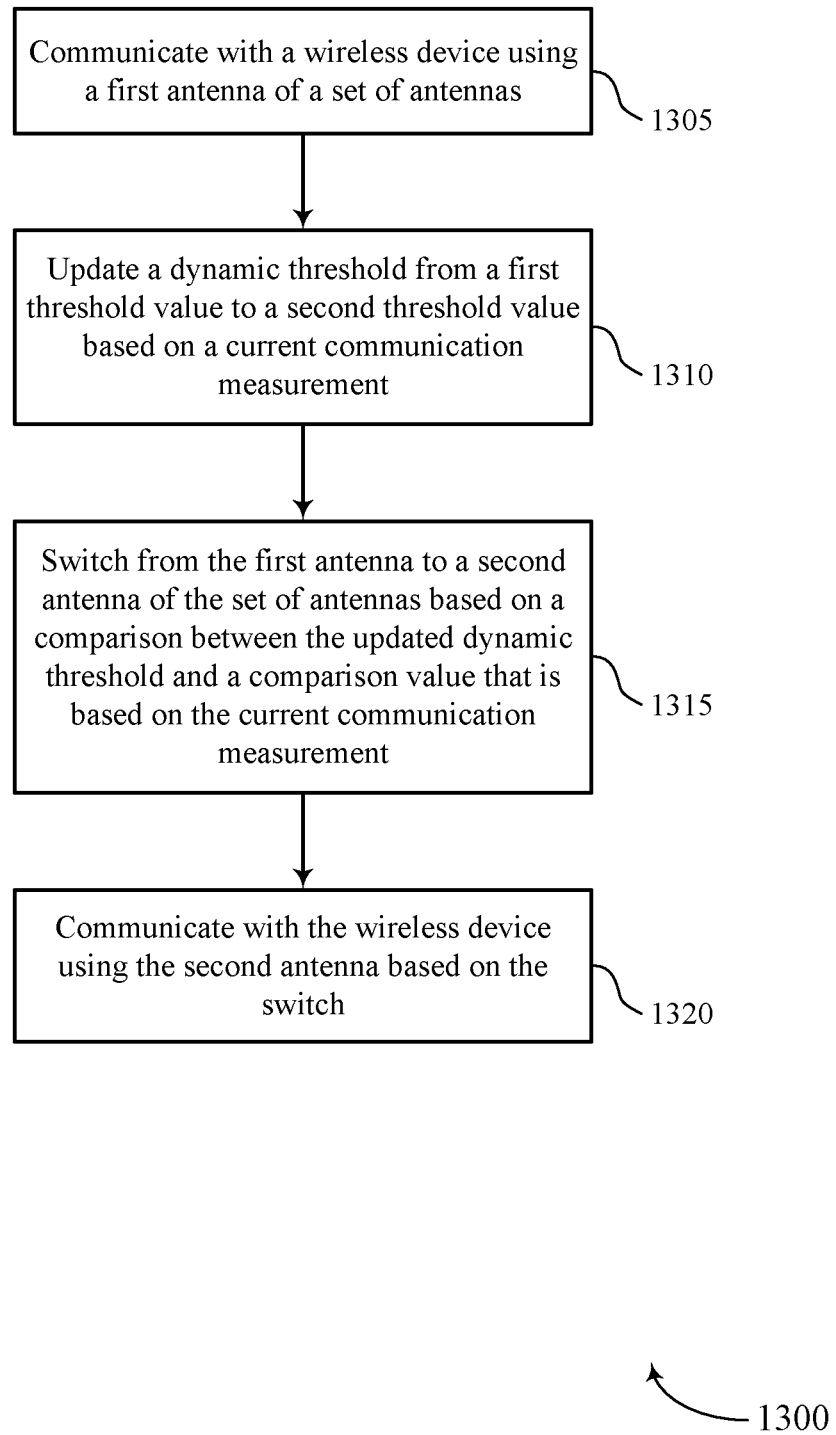
FIGS. 13 through 16 show flowcharts illustrating methods that support dynamic thresholds for ASDIV in accordance with aspects of the present disclosure.

FIG. 13 shows a flowchart illustrating a method 1300 that supports dynamic thresholds for ASDIV in accordance with aspects of the present disclosure. The operations of method 1300 may be implemented by a UE 115 or its components as described herein. For example, the operations of method 1300 may be performed by an antenna manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1305, the UE may communicate with a wireless device using a first antenna of a set of antennas. The operations of 1305 may be performed according to the methods described herein. In some examples, aspects of the operations of 1305 may be performed by a communication component as described with reference to FIGS. 9 through 12.

At 1310, the UE may update a dynamic threshold from a first threshold value to a second threshold value different from the first threshold value based on a current communication measurement. The operations of 1310 may be performed according to the methods described herein. In some examples, aspects of the operations of 1310 may be performed by a threshold updating component as described with reference to FIGS. 9 through 12.

At 1315, the UE may switch from the first antenna to a second antenna of the set of antennas based on a comparison between the updated dynamic threshold and a comparison value that is based on the current communication measurement. The operations of 1315 may be performed according to the methods described herein. In some examples, aspects of the operations of 1315 may be performed by a switching component as described with reference to FIGS. 9 through 12.

At 1320, the UE may communicate with the wireless device using the second antenna based on the switch. The operations of 1320 may be performed according to the methods described herein. In some examples, aspects of the operations of 1320 may be performed by a communication component as described with reference to FIGS. 9 through 12.

Figure 14:
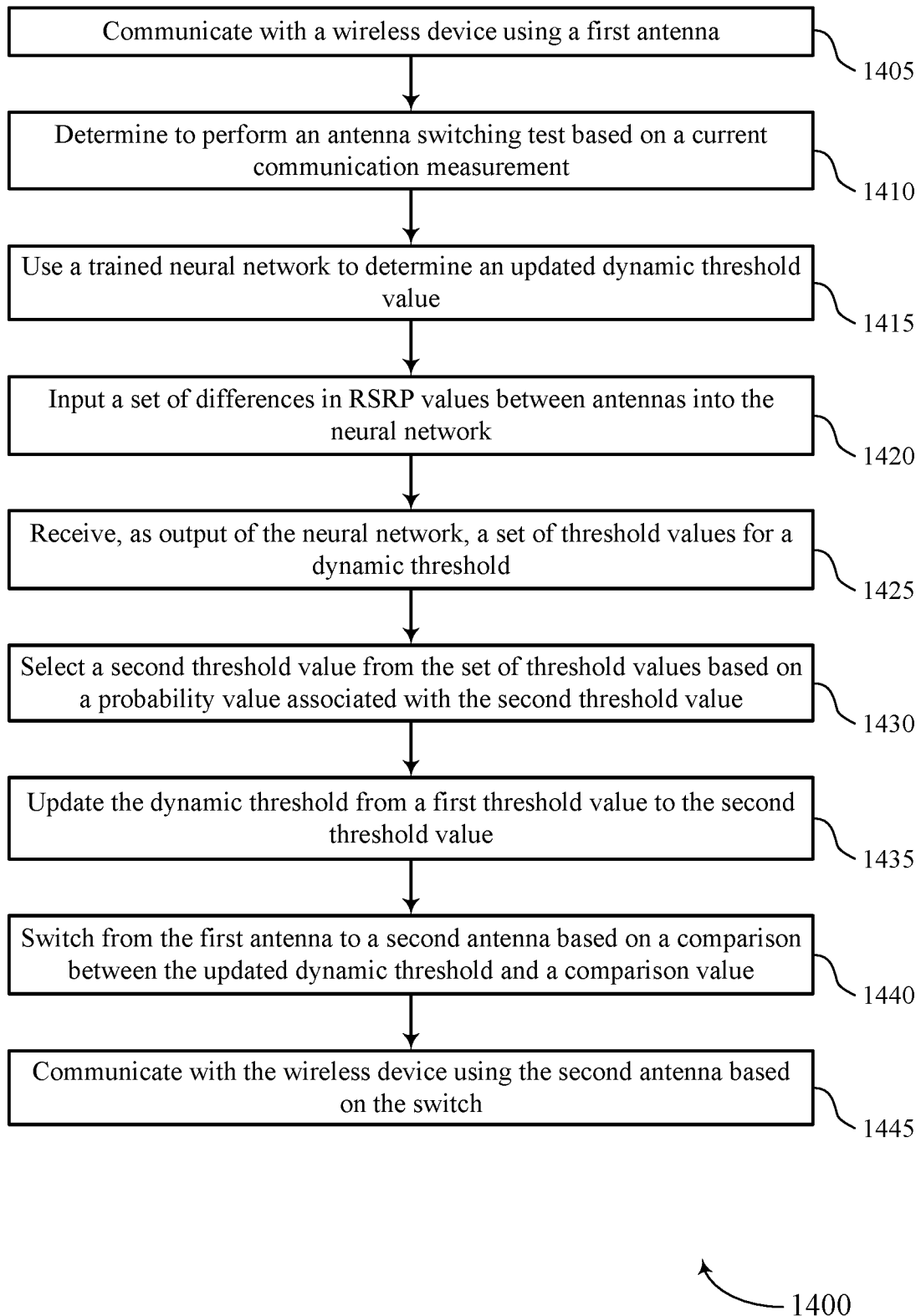

FIG. 14 shows a flowchart illustrating a method 1400 that supports dynamic thresholds for ASDIV in accordance with aspects of the present disclosure. The operations of method 1400 may be implemented by a UE 115 or its components as described herein. For example, the operations of method 1400 may be performed by an antenna manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1405, the UE may communicate with a wireless device using a first antenna of a set of antennas. The operations of 1405 may be performed according to the methods described herein. In some examples, aspects of the operations of 1405 may be performed by a communication component as described with reference to FIGS. 9 through 12.

At 1410, the UE may determine to perform an antenna switching test on the set of antennas based on a current communication measurement. The operations of 1410 may be performed according to the methods described herein. In some examples, aspects of the operations of 1410 may be performed by an antenna switching test component as described with reference to FIGS. 9 through 12.

At 1415, the UE may use a neural network to determine an updated dynamic threshold value. Using the neural network may involve the operations of 1420, 1425, and 1430 as described herein. The operations of 1415 may be performed according to the methods described herein. In some examples, aspects of the operations of 1415 may be performed by a machine learning agent unit as described with reference to FIGS. 9 through 12.

At 1420, the UE may input a set of differences in RSRPs between antennas of the set of antennas into the neural network. The operations of 1420 may be performed according to the methods described herein. In some examples, aspects of the operations of 1420 may be performed by a machine learning agent unit as described with reference to FIGS. 9 through 12.

At 1425, the UE may receive, as output of the neural network, a set of threshold values for the dynamic threshold. The operations of 1425 may be performed according to the methods described herein. In some examples, aspects of the operations of 1425 may be performed by a machine learning agent unit as described with reference to FIGS. 9 through 12.

At 1430, the UE may select a second threshold value from the set of threshold values based on a probability value associated with the second threshold value. The operations of 1430 may be performed according to the methods described herein. In some examples, aspects of the operations of 1430 may be performed by a machine learning agent unit as described with reference to FIGS. 9 through 12.

At 1435, the UE may update a dynamic threshold from a first threshold value to the second threshold value different from the first threshold value based on the current communication measurement. The operations of 1435 may be performed according to the methods described herein. In some examples, aspects of the operations of 1435 may be performed by a threshold updating component as described with reference to FIGS. 9 through 12.

At 1440, the UE may switch from the first antenna to a second antenna of the set of antennas based on a comparison between the updated dynamic threshold and a comparison value that is based on the current communication measurement. The operations of 1440 may be performed according to the methods described herein. In some examples, aspects of the operations of 1440 may be performed by a switching component as described with reference to FIGS. 9 through 12.

At 1445, the UE may communicate with the wireless device using the second antenna based on the switch. The operations of 1445 may be performed according to the methods described herein. In some examples, aspects of the operations of 1445 may be performed by a communication component as described with reference to FIGS. 9 through 12.

Figure 15:
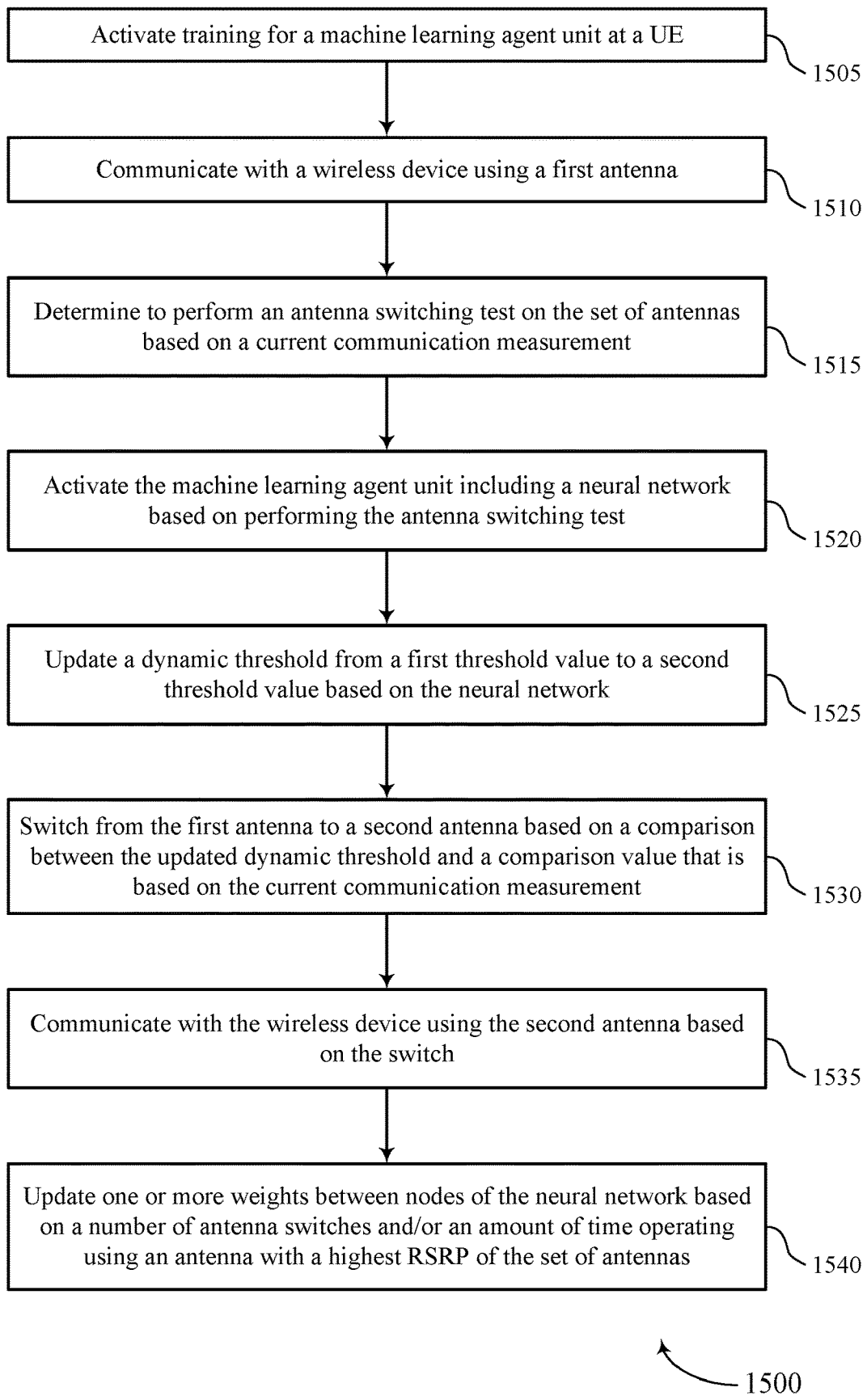

FIG. 15 shows a flowchart illustrating a method 1500 that supports dynamic thresholds for ASDIV in accordance with aspects of the present disclosure. The operations of method 1500 may be implemented by a UE 115 or its components as described herein. For example, the operations of method 1500 may be performed by an antenna manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1505, the UE may activate training for a machine learning agent unit at the UE. The operations of 1505 may be performed according to the methods described herein. In some examples, aspects of the operations of 1505 may be performed by a training component as described with reference to FIGS. 9 through 12.

At 1510, the UE may communicate with a wireless device using a first antenna of a set of antennas. The operations of 1510 may be performed according to the methods described herein. In some examples, aspects of the operations of 1510 may be performed by a communication component as described with reference to FIGS. 9 through 12.

At 1515, the UE may determine to perform an antenna switching test on the set of antennas based on a current communication measurement. The operations of 1515 may be performed according to the methods described herein. In some examples, aspects of the operations of 1515 may be performed by an antenna switching test component as described with reference to FIGS. 9 through 12.

At 1520, the UE may activate the machine learning agent unit including a neural network based on performing the antenna switching test, where the dynamic threshold is updated based on the neural network. The operations of 1520 may be performed according to the methods described herein. In some examples, aspects of the operations of 1520 may be performed by a machine learning agent unit as described with reference to FIGS. 9 through 12.

At 1525, the UE may update a dynamic threshold from a first threshold value to a second threshold value different from the first threshold value based on the current communication measurement. The operations of 1525 may be performed according to the methods described herein. In some examples, aspects of the operations of 1525 may be performed by a threshold updating component as described with reference to FIGS. 9 through 12.

At 1530, the UE may switch from the first antenna to a second antenna of the set of antennas based on a comparison between the updated dynamic threshold and a comparison value that is based on the current communication measurement. The operations of 1530 may be performed according to the methods described herein. In some examples, aspects of the operations of 1530 may be performed by a switching component as described with reference to FIGS. 9 through 12.

At 1535, the UE may communicate with the wireless device using the second antenna based on the switch. The operations of 1535 may be performed according to the methods described herein. In some examples, aspects of the operations of 1535 may be performed by a communication component as described with reference to FIGS. 9 through 12.

At 1540, the UE may update one or more weights between nodes of the neural network based on one or both of a number of antenna switches and an amount of time operating using an antenna with a highest RSRP of the set of antennas. Updating the weights may be based on the activated training for the machine learning agent unit. The operations of 1540 may be performed according to the methods described herein. In some examples, aspects of the operations of 1540 may be performed by a training component as described with reference to FIGS. 9 through 12.

Figure 16:
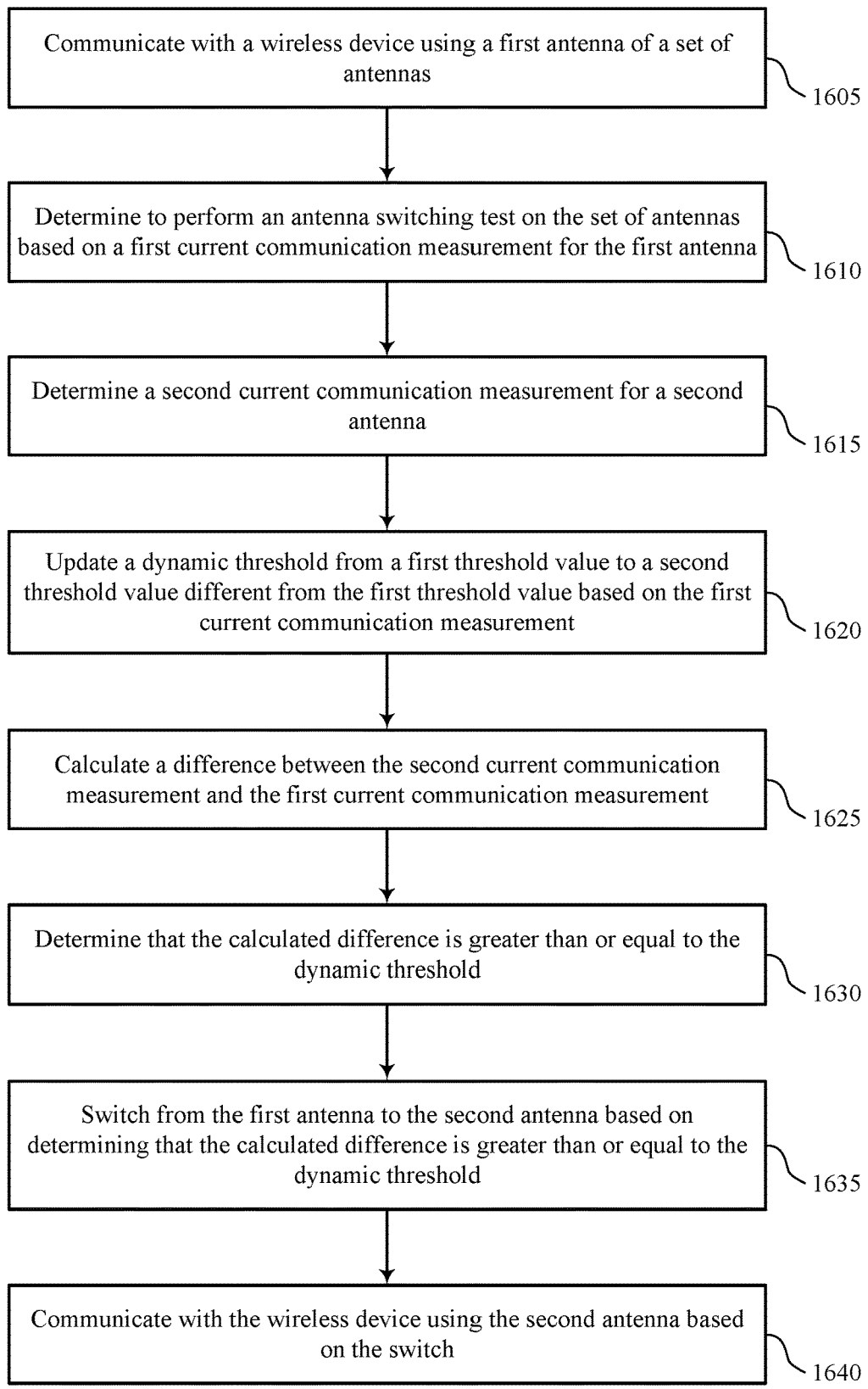

FIG. 16 shows a flowchart illustrating a method 1600 that supports dynamic thresholds for ASDIV in accordance with aspects of the present disclosure. The operations of method 1600 may be implemented by a UE 115 or its components as described herein. For example, the operations of method 1600 may be performed by an antenna manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1605, the UE may communicate with a wireless device using a first antenna of a set of antennas. The operations of 1605 may be performed according to the methods described herein. In some examples, aspects of the operations of 1605 may be performed by a communication component as described with reference to FIGS. 9 through 12.

At 1610, the UE may determine to perform an antenna switching test on the set of antennas based on a current communication measurement. The operations of 1610 may be performed according to the methods described herein. In some examples, aspects of the operations of 1610 may be performed by an antenna switching test component as described with reference to FIGS. 9 through 12.

At 1615, the UE may determine a second current communication measurement for a second antenna. The operations of 1615 may be performed according to the methods described herein. In some examples, aspects of the operations of 1615 may be performed by a threshold comparison component as described with reference to FIGS. 9 through 12.

At 1620, the UE may update a dynamic threshold from a first threshold value to a second threshold value different from the first threshold value based on the current communication measurement. The operations of 1620 may be performed according to the methods described herein. In some examples, aspects of the operations of 1620 may be performed by a threshold updating component as described with reference to FIGS. 9 through 12.

At 1625, the UE may calculate a difference between the second current communication measurement and the first current communication measurement. The operations of 1625 may be performed according to the methods described herein. In some examples, aspects of the operations of 1625 may be performed by a threshold comparison component as described with reference to FIGS. 9 through 12.

At 1630, the UE may determine that the calculated difference is greater than or equal to the dynamic threshold. The operations of 1630 may be performed according to the methods described herein. In some examples, aspects of the operations of 1630 may be performed by a threshold comparison component as described with reference to FIGS. 9 through 12.

At 1635, the UE may switch from the first antenna to a second antenna of the set of antennas based on a comparison between the updated dynamic threshold and a comparison value (i.e., the calculated difference) that is based on the current communication measurement. That is, the switching from the first antenna to the second antenna is based on the determining that the calculated difference is greater than or equal to the dynamic threshold. The operations of 1635 may be performed according to the methods described herein. In some examples, aspects of the operations of 1635 may be performed by a switching component as described with reference to FIGS. 9 through 12.

At 1640, the UE may communicate with the wireless device using the second antenna based on the switch. The operations of 1640 may be performed according to the methods described herein. In some examples, aspects of the operations of 1640 may be performed by a communication component as described with reference to FIGS. 9 through 12.

As used herein with reference to FIGS. 13 through 16 (and, more generally, with reference to FIGS. 1 through 16), the phrase "based on" may be construed in the same manner as the phrase "based at least in part on." That is, the phrase "based on" shall not be construed as a reference to a closed set of conditions. For example, an exemplary step that is described as "based on condition A" may be based on both a condition A and a condition B without departing from the scope of the present disclosure.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Embodiment 1

A method for wireless communications at a UE, comprising: communicating with a wireless device using a first antenna of a plurality of antennas; updating a dynamic threshold from a first threshold value to a second threshold value different from the first threshold value based at least in part on a current communication measurement; switching from the first antenna to a second antenna of the plurality of antennas based at least in part on a comparison between the updated dynamic threshold and a comparison value that is based at least in part on the current communication measurement; and communicating with the wireless device using the second antenna based at least in part on the switch.

Embodiment 2

The method of embodiment 1, wherein the dynamic threshold is updated based at least in part on a neural network.

Embodiment 3

The method of embodiment 2, wherein updating the dynamic threshold comprises: inputting a set of differences in RSRPs between antennas of the plurality of antennas into the neural network; receiving, as output of the neural network, a set of threshold values for the dynamic threshold; and selecting the second threshold value from the set of threshold values based at least in part on a probability value associated with the second threshold value.

Embodiment 4

The method of either of embodiments 2 or 3, further comprising: activating training for a machine learning agent unit comprising the neural network at the UE; and updating one or more weights between nodes of the neural network based at least in part on one or both of a number of antenna switches and an amount of time operating using an antenna with a highest RSRP of the plurality of antennas, wherein the dynamic threshold is updated based at least in part on the one or more updated weights between the nodes of the neural network.

Embodiment 5

The method of embodiment 4, wherein updating the one or more weights between nodes of the neural network comprises: comparing the number of antenna switches using the dynamic threshold to a number of antenna switches using a static threshold; and applying a reward value or a cost value to a cost function for the neural network based at least in part on the comparing, wherein updating the one or more weights between the nodes of the neural network is based at least in part on the cost function.

Embodiment 6

The method of embodiment 4, wherein updating the one or more weights between nodes of the neural network comprises: comparing the amount of time operating using the antenna with the highest RSRP of the plurality of antennas using the dynamic threshold to an amount of time operating the antenna with the highest RSRP of the plurality of antennas using a static threshold; and applying a reward value or a cost value to a cost function for the neural network based at least in part on the comparing, wherein updating the one or more weights between the nodes of the neural network is based at least in part on the cost function.

Embodiment 7

The method of embodiment 4, wherein updating the one or more weights between nodes of the neural network comprises: comparing the number of antenna switches using the dynamic threshold to a number of antenna switches using a static threshold; applying a first reward value or a first cost value to a cost function for the neural network based at least in part on the comparing the number of antenna switches; comparing the amount of time operating using the antenna with the highest RSRP of the plurality of antennas using the dynamic threshold to an amount of time operating the antenna with the highest RSRP of the plurality of antennas using a static threshold; and applying a second reward value or a second cost value to the cost function for the neural network based at least in part on the comparing the amount of time operating using the antenna with the highest RSRP, wherein updating the one or more weights between the nodes of the neural network is based at least in part on the cost function.

Embodiment 8

The method of any of embodiments 4 to 7, wherein the training for the machine learning agent unit is activated at the UE based at least in part on one or both of the number of antenna switches and the amount of time operating using the antenna with the highest RSRP of the plurality of antennas.

Embodiment 9

The method of any of embodiments 4 to 7, wherein the training for the machine learning agent unit is activated at the UE based at least in part on a UE training schedule.

Embodiment 10

The method of any of embodiments 4 to 9, further comprising deactivating the training for the machine learning agent unit at the UE.

Embodiment 11

The method of any of embodiments 2 to 10, further comprising determining the neural network specific to one or more of a chipset, a type of UE, the UE, and a user operating the UE.

Embodiment 12

The method of any of embodiments 1 to 11, wherein the current communication measurement comprises a first RSRP for the first antenna, the method further comprising: measuring an RSRP for each antenna of the plurality of antennas; and identifying that the first RSRP for the first antenna is a highest RSRP for the plurality of antennas for less than a threshold percentage of time for a measurement cycle, wherein the dynamic threshold is updated based at least in part on the identifying.

Embodiment 13

The method of any of embodiments 1 to 11, wherein the current communication measurement comprises a transmit power for the first antenna, the method further comprising: identifying that the transmit power for the first antenna is greater than a transmit power threshold, wherein the dynamic threshold is updated based at least in part on the identifying.

Embodiment 14

The method of any of embodiments 1 to 13, wherein the current communication measurement comprises a first current communication measurement for the first antenna, the method further comprising: determining a second current communication measurement for the second antenna; and calculating a difference between the second current communication measurement and the first current communication measurement, wherein the comparison value comprises the calculated difference.

Embodiment 15

The method of embodiment 14, further comprising determining that the calculated difference is greater than or equal to the dynamic threshold, wherein the switching from the first antenna to the second antenna is based at least in part on the determining that the calculated difference is greater than or equal to the dynamic threshold.

Embodiment 16

The method of any of embodiments 1 to 15, further comprising reducing a transmit power for transmission based at least in part on the switch.

Embodiment 17

The method of any of embodiments 1 to 16, wherein the current communication measurement comprises a measurement of a downlink signal or a measurement of transmitted power using a feedback receiver, and wherein the communicating with the wireless device using the second antenna comprises transmitting an uplink signal to the wireless device using the second antenna based at least in part on the switch.

Embodiment 18

The method of any of embodiments 1 to 17, wherein the current communication measurement comprises one or both of an average RSRP of the first antenna for a measurement cycle and an average transmit power of the first antenna for the measurement cycle.

Embodiment 19

The method of embodiment 18, further comprising: periodically measuring the current communication measurement according to the measurement cycle; and periodically determining whether to update the dynamic threshold according to the measurement cycle and based at least in part on the periodical measuring.

Embodiment 20

An apparatus comprising at least one means for performing a method of any of embodiments 1 to 19.

Embodiment 21

An apparatus for wireless communications comprising a processor; and memory in electronic communication with the processor storing instructions executable by the processor to cause the apparatus to perform a method of any of embodiments 1 to 19.

Embodiment 22

A non-transitory computer-readable medium storing code for wireless communications, the code comprising instructions executable by a processor to perform a method of any of embodiments 1 to 19.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   communicating with a wireless device using a first antenna of a plurality of antennas;
   obtaining a communication measurement for each antenna of the plurality of antennas;
   determining that a first communication measurement for the first antenna is less than at least another communication measurement for the plurality of antennas for a time threshold;
   updating a dynamic threshold from a first threshold value to a second threshold value different from the first threshold value based at least in part on the determining;
   switching from the first antenna to a second antenna of the plurality of antennas based at least in part on a comparison between the updated dynamic threshold and a comparison value that is based at least in part on the first communication measurement; and
   communicating with the wireless device using the second antenna based at least in part on the switch.

2. The method of claim 1, wherein the dynamic threshold is updated based at least in part on a neural network.

3. The method of claim 2, wherein updating the dynamic threshold comprises:
   inputting a set of differences in reference signal received powers between antennas of the plurality of antennas into the neural network;
   receiving, as output of the neural network, a set of threshold values for the dynamic threshold; and
   selecting the second threshold value from the set of threshold values based at least in part on a probability value associated with the second threshold value.

4. The method of claim 2, further comprising:
   activating training for a machine learning agent unit comprising the neural network at the UE; and
   updating one or more weights between nodes of the neural network based at least in part on one or both of a number of antenna switches and an amount of time operating using an antenna with a highest reference signal received power of the plurality of antennas, wherein the dynamic threshold is updated based at least in part on the one or more updated weights between the nodes of the neural network.

5. The method of claim 4, wherein updating the one or more weights between nodes of the neural network comprises:
   comparing the number of antenna switches using the dynamic threshold to a second number of antenna switches using a static threshold; and
   applying a reward value or a cost value to a cost function for the neural network based at least in part on the comparing, wherein updating the one or more weights between the nodes of the neural network is based at least in part on the cost function.

6. The method of claim 4, wherein updating the one or more weights between nodes of the neural network comprises:
   comparing the amount of time operating using the antenna with the highest reference signal received power of the plurality of antennas using the dynamic threshold to a second amount of time operating using the antenna with the highest reference signal received power of the plurality of antennas using a static threshold; and
   applying a reward value or a cost value to a cost function for the neural network based at least in part on the comparing, wherein updating the one or more weights between the nodes of the neural network is based at least in part on the cost function.

7. The method of claim 4, wherein the training for the machine learning agent unit is activated at the UE based at least in part on one or both of the number of antenna switches and the amount of time operating using the antenna with the highest reference signal received power of the plurality of antennas.

8. The method of claim 4, wherein the training for the machine learning agent unit is activated at the UE based at least in part on a UE training schedule.

9. The method of claim 4, further comprising:
deactivating the training for the machine learning agent unit at the UE.

10. The method of claim 2, further comprising:
determining the neural network specific to one or more of a chipset, a type of UE, the UE, and a user operating the UE.

11. The method of claim 1, wherein the first communication measurement comprises a first reference signal received power for the first antenna and the communication measurement for each antenna comprises a reference signal received power for each antenna, the determining comprising:
identifying that the first reference signal received power for the first antenna is a highest reference signal received power for the plurality of antennas for less than a threshold percentage of time for a measurement cycle, wherein the dynamic threshold is updated based at least in part on the identifying.

12. The method of claim 1, further comprising:
identifying that a transmit power for the first antenna is greater than a transmit power threshold, wherein the dynamic threshold is updated further based at least in part on the identifying.

13. The method of claim 1, further comprising:
calculating a difference between a second communication measurement for the second antenna and the first communication measurement for the first antenna, wherein the comparison value comprises the calculated difference.

14. The method of claim 13, further comprising:
determining that the calculated difference is greater than or equal to the dynamic threshold, wherein the switching from the first antenna to the second antenna is based at least in part on the determining that the calculated difference is greater than or equal to the dynamic threshold.

15. The method of claim 1, further comprising:
reducing a transmit power for transmission based at least in part on the switch.

16. The method of claim 1, wherein the first communication measurement comprises a measurement of a downlink signal, and wherein the communicating with the wireless device using the second antenna comprises:
transmitting an uplink signal to the wireless device using the second antenna based at least in part on the switch.

17. The method of claim 1, wherein the first communication measurement comprises an average reference signal received power of the first antenna for a measurement cycle.

18. The method of claim 17, further comprising:
periodically measuring the first communication measurement according to the measurement cycle; and
periodically determining whether to update the dynamic threshold according to the measurement cycle and based at least in part on the periodical measuring.

19. An apparatus for wireless communications at a user equipment (UE), comprising:
a processor; and
memory in electronic communication with the processor storing instructions executable by the processor to cause the apparatus to:
communicate with a wireless device using a first antenna of a plurality of antennas;
obtain a communication measurement for each antenna of the plurality of antennas;
determine that a first communication measurement for the first antenna is less than at least another communication measurement for the plurality of antennas for a time threshold;
update a dynamic threshold from a first threshold value to a second threshold value different from the first threshold value based at least in part on the determining;
switch from the first antenna to a second antenna of the plurality of antennas based at least in part on a comparison between the updated dynamic threshold and a comparison value that is based at least in part on the first communication measurement; and
communicate with the wireless device using the second antenna based at least in part on the switch.

20. The apparatus of claim 19, wherein the dynamic threshold is updated based at least in part on a neural network.

21. The apparatus of claim 20, wherein the instructions to update the dynamic threshold are executable by the processor to cause the apparatus to:
input a set of differences in reference signal received powers between antennas of the plurality of antennas into the neural network;
receive, as output of the neural network, a set of threshold values for the dynamic threshold; and
select the second threshold value from the set of threshold values based at least in part on a probability value associated with the second threshold value.

22. The apparatus of claim 20, wherein the instructions are further executable by the processor to cause the apparatus to:
activate training for a machine learning agent unit comprising the neural network at the UE; and
update one or more weights between nodes of the neural network based at least in part on one or both of a number of antenna switches and an amount of time operating using an antenna with a highest reference signal received power of the plurality of antennas, wherein the dynamic threshold is updated based at least in part on the one or more updated weights between the nodes of the neural network.

23. The apparatus of claim 22, wherein the instructions to update the one or more weights between nodes of the neural network are executable by the processor to cause the apparatus to:
compare the number of antenna switches using the dynamic threshold to a number of antenna switches using a static threshold; and
apply a reward value or a cost value to a cost function for the neural network based at least in part on the comparing, wherein updating the one or more weights between the nodes of the neural network is based at least in part on the cost function.

24. The apparatus of claim 22, wherein the instructions to update the one or more weights between nodes of the neural network are executable by the processor to cause the apparatus to:
compare the amount of time operating using the antenna with the highest reference signal received power of the plurality of antennas using the dynamic threshold to an amount of time operating the antenna with the highest reference signal received power of the plurality of antennas using a static threshold; and apply a reward value or a cost value to a cost function for the neural network based at least in part on the comparing, wherein updating the one or more weights between the nodes of the neural network is based at least in part on the cost function.

25. The apparatus of claim 22, wherein the training for the machine learning agent unit is activated at the UE based at least in part on one or both of the number of antenna switches and the amount of time operating using the antenna with the highest reference signal received power of the plurality of antennas.

26. The apparatus of claim 22, wherein the training for the machine learning agent unit is activated at the UE based at least in part on a UE training schedule.

27. The apparatus of claim 22, wherein the instructions are further executable by the processor to cause the apparatus to:
deactivate the training for the machine learning agent unit at the UE.

28. The apparatus of claim 20, wherein the instructions are further executable by the processor to cause the apparatus to:
determine the neural network specific to one or more of a chipset, a type of UE, the UE, and a user operating the UE.

29. The apparatus of claim 19, wherein the first communication measurement comprises a first reference signal received power for the first antenna and the communication measurement for each antenna comprises a reference signal received power for each antenna, wherein the instructions to determine are further executable by the processor to cause the apparatus to:
identify that the first reference signal received power for the first antenna is a highest reference signal received power for the plurality of antennas for less than a threshold percentage of time for a measurement cycle, wherein the dynamic threshold is updated based at least in part on the identifying.

30. The apparatus of claim 19, wherein the the instructions are further executable by the processor to cause the apparatus to:
identify that a transmit power for the first antenna is greater than a transmit power threshold, wherein the dynamic threshold is updated further based at least in part on the identifying.

31. The apparatus of claim 19, wherein the instructions are further executable by the processor to cause the apparatus to:
calculate a difference between a second communication measurement for the second antenna and the first communication measurement for the first antenna, wherein the comparison value comprises the calculated difference.

32. The apparatus of claim 31, wherein the instructions are further executable by the processor to cause the apparatus to:
determine that the calculated difference is greater than or equal to the dynamic threshold, wherein the switching from the first antenna to the second antenna is based at least in part on the determining that the calculated difference is greater than or equal to the dynamic threshold.

33. The apparatus of claim 19, wherein the instructions are further executable by the processor to cause the apparatus to:
reduce a transmit power for transmission based at least in part on the switch.

34. The apparatus of claim 19, wherein the first communication measurement comprises a measurement of a downlink signal, and wherein the instructions to communicate with the wireless device using the second antenna are executable by the processor to cause the apparatus to:
transmit an uplink signal to the wireless device using the second antenna based at least in part on the switch.

35. The apparatus of claim 19, wherein the first communication measurement comprises an average reference signal received power of the first antenna for a measurement cycle.

36. The apparatus of claim 35, wherein the instructions are further executable by the processor to cause the apparatus to:
periodically measure the first communication measurement according to the measurement cycle; and
periodically determine whether to update the dynamic threshold according to the measurement cycle and based at least in part on the periodical measuring.

37. An apparatus for wireless communications at a user equipment (UE), comprising:
means for communicating with a wireless device using a first antenna of a plurality of antennas;
means for obtaining a communication measurement for each antenna of the plurality of antennas;
means for determining that a first communication measurement for the first antenna is less than at least another communication measurement for the plurality of antennas for a time threshold;
means for updating a dynamic threshold from a first threshold value to a second threshold value different from the first threshold value based at least in part on the determining;
means for switching from the first antenna to a second antenna of the plurality of antennas based at least in part on a comparison between the updated dynamic threshold and a comparison value that is based at least in part on the first communication measurement; and
means for communicating with the wireless device using the second antenna based at least in part on the switch.

38. A non-transitory computer-readable medium storing code for wireless communications at a user equipment (UE), the code comprising instructions executable by a processor to:
communicate with a wireless device using a first antenna of a plurality of antennas;
obtain a communication measurement for each antenna of the plurality of antennas;
determine that a first communication measurement for the first antenna is less than at least another communication measurement for the plurality of antennas for a time threshold;
update a dynamic threshold from a first threshold value to a second threshold value different from the first threshold value based at least in part on the determining;
switch from the first antenna to a second antenna of the plurality of antennas based at least in part on a comparison between the updated dynamic threshold and a comparison value that is based at least in part on the first communication measurement; and
communicate with the wireless device using the second antenna based at least in part on the switch.

* * * * *